(12) United States Patent
Tsuda et al.

(10) Patent No.: US 10,448,101 B2
(45) Date of Patent: Oct. 15, 2019

(54) COMMUNICATION SYSTEM, COMMUNICATION METHOD, COMMUNICATION TERMINAL, INFORMATION-PROCESSING SYSTEM, INFORMATION-PROCESSING METHOD, AND STORAGE MEDIUM

(71) Applicant: NINTENDO CO., LTD., Kyoto (JP)

(72) Inventors: Munetaka Tsuda, Kyoto (JP); Tsuyoshi Kurita, Kyoto (JP); Miki Murakami, Kyoto (JP); Yosuke Fujino, Kyoto (JP); Fumihiko Tamiya, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 287 days.

(21) Appl. No.: 15/590,121

(22) Filed: May 9, 2017

(65) Prior Publication Data

US 2018/0199201 A1    Jul. 12, 2018

(30) Foreign Application Priority Data

Jan. 11, 2017 (JP) .................. 2017-002750

(51) Int. Cl.
*G06F 21/10* (2013.01)
*H04L 29/06* (2006.01)
(Continued)

(52) U.S. Cl.
CPC ........... *H04N 21/454* (2013.01); *A63F 13/75* (2014.09); *A63F 13/79* (2014.09); *H04L 63/102* (2013.01); *H04L 63/20* (2013.01); *H04L 67/2861* (2013.01); *H04L 67/38* (2013.01); *H04N 21/2541* (2013.01); *H04N 21/25891* (2013.01); *H04N 21/4753* (2013.01);
(Continued)

(58) Field of Classification Search
CPC ....... H04L 63/10; G06F 21/10; G06F 21/305; H04W 4/00
See application file for complete search history.

(56) References Cited

U.S. PATENT DOCUMENTS

2015/0228153 A1* 8/2015 Hedrick .............. G07F 17/3225
463/25

OTHER PUBLICATIONS

[Online] Mamoruzo+, Axseed Inc., http://www.axseed.co.jp/?page_id=3830>, Accessed Jan. 5, 2017, w/ English Translation—2 pages.

* cited by examiner

*Primary Examiner* — Izunna Okeke
(74) *Attorney, Agent, or Firm* — Nixon & Vanderhye P.C.

(57) ABSTRACT

Exemplary communication system 1 includes communication terminal 10, game device 20, and setting management server 30, each of which is connectable to network 50. Communication terminal 10 includes a processing requesting unit configured to request to setting management server 30 execution of processing on game device 20. Setting management server 30 includes a processing instruction unit configured to instruct game device 20 to perform the requested execution of processing. Game device 20 is a communication terminal not always connected to network 50, which device includes a network connection control unit configured to control connection to network 50, and a processing execution unit configured to perform the instructed execution of processing, upon detecting that game device 20, which was not connected to network 50, has been caused to connect to the network by the network connection control unit.

17 Claims, 18 Drawing Sheets

(51) Int. Cl.
    *H04N 21/454*     (2011.01)
    *H04N 21/258*     (2011.01)
    *H04N 21/478*     (2011.01)
    *H04L 29/08*     (2006.01)
    *H04N 21/254*     (2011.01)
    *H04N 21/475*     (2011.01)
    *A63F 13/75*     (2014.01)
    *A63F 13/79*     (2014.01)

(52) U.S. Cl.
    CPC ..... *H04N 21/4755* (2013.01); *H04N 21/4781* (2013.01); *A63F 2300/535* (2013.01)

| GAME ID | PLAY START DATE AND TIME | PLAY END DATE AND TIME |
|---|---|---|
| G001 | 2016/12/01 21:00 | 2016/12/01 22:00 |
| G002 | 2016/12/03 10:00 | 2016/12/03 12:00 |
| G003 | 2016/12/04 16:00 | 2016/12/04 18:00 |
| ⋮ | ⋮ | ⋮ |

| USER ID | USER NAME | USER IMAGE | PASSWORD |
|---|---|---|---|
| U001 | userA | imgUa | ******** |
| U002 | userB | imgUb | ******** |
| U003 | userC | imgUc | ******** |
| ⋮ | ⋮ | ⋮ | ⋮ |

| USER ID | DEVICE ID |
|---|---|
| U004 | M001 |
| U005 | M002 |
| U006 | M003 |
| ⋮ | ⋮ |

| DEVICE ID | PLAY TIME | REFLECTED | RESTRICTION LEVEL | REFLECTED | MONITORING NOTICE |
|---|---|---|---|---|---|
| M004 | 1 HOUR | YES | ELEMENTARY | YES | YES |
| M005 | NOT SET | YES | HIGH/JUNIOR HIGH | YES | NO |
| M006 | 30 MIN | NO | CHILD | NO | YES |
| ⋮ | ⋮ | ⋮ | ⋮ | ⋮ | ⋮ |

| GAME ID | PLAY START DATE AND TIME | PLAY END DATE AND TIME |
|---|---|---|
| G004 | 2016/12/05 20:00 | 2016/12/01 21:00 |
| G005 | 2016/12/06 19:00 | 2016/12/06 21:00 |
| G006 | 2016/12/08 17:00 | 2016/12/08 18:00 |
| ⋮ | ⋮ | ⋮ |

| GAME ID | GAME NAME | GAME IMAGE |
|---|---|---|
| G007 | gameA | imgGa |
| G008 | gameB | imgGb |
| G009 | gameC | imgGc |
| ⋮ | ⋮ | ⋮ |

| DEVICE ID | INSTRUCTION INFORMATION |
|---|---|
| M007 | SETTING USAGE RESTRICTION |
| M008 | UPLOADING GAME HISTORY |
| M009 | SETTING USAGE RESTRICTION |
| ⋮ | ⋮ |

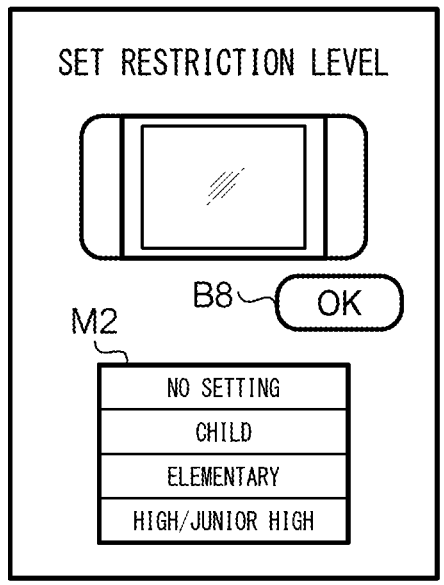
FIG. 24      FIG. 25
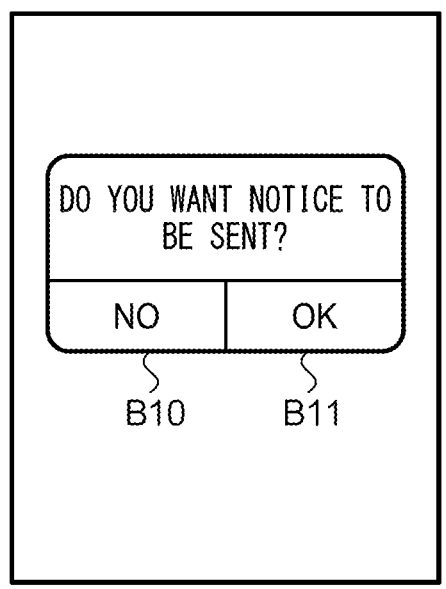
FIG. 26      FIG. 27

COMMUNICATION SYSTEM, COMMUNICATION METHOD, COMMUNICATION TERMINAL, INFORMATION-PROCESSING SYSTEM, INFORMATION-PROCESSING METHOD, AND STORAGE MEDIUM

CROSS REFERENCE TO RELATED APPLICATIONS

The disclosure of Japanese Patent Application No. 2017-2750, filed on Jan. 11, 2017, is incorporated herein by reference.

FIELD

An exemplary embodiment relates to a technique for causing, via a network, a not-always-connected terminal to execute processing.

BACKGROUND AND SUMMARY

There are known in the art parental controls that function to enable a parent to monitor and restrict use of an information-processing device by a child.

An exemplary embodiment provides a communication system including a first communication terminal, a second communication terminal, and a server device, each of which is connectable to a network. The first communication terminal includes a processing requesting unit configured to request to the server device for execution of processing on the second communication terminal. The server device includes a processing instruction unit configured to instruct the second communication terminal to perform the requested execution of processing. The second communication terminal is a communication terminal not always connected to the network, and includes a network connection control unit configured to control connection to the network, and a processing execution unit configured to perform the instructed execution of processing, upon detecting that the second communication terminal, which was not connected to the network, has been caused to connect to the network by the network connection control unit.

BRIEF DESCRIPTION OF THE DRAWINGS

FIG. 24 is a diagram showing an example of a restriction level setting screen.

FIG. 25 is a diagram showing an example of a setting completion screen.

FIG. 26 is a diagram showing an example of a monitoring start screen.

FIG. 27 is a diagram showing an example of a monitoring notice request screen.

DETAILED DESCRIPTION OF NON-LIMITING EXEMPLARY EMBODIMENTS

1. Embodiment 1-1. Configuration
1-1-1. Configuration of Communication System 1

Figure 1:
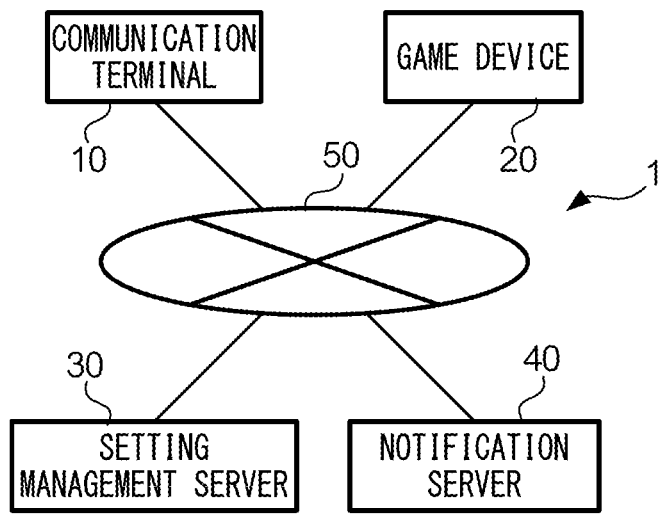
FIG. 1 is a diagram showing an example of a configuration of communication system 1.

FIG. 1 is a diagram showing an example of a configuration of communication system 1 according to an embodiment, which includes communication terminal 10, game device 20, setting management server 30, and notification server 40. It is of note that for the purpose of illustration, only one communication terminal 10 and one game device 20 are shown in the drawing; however, two or more communication terminals 10 and game devices 20 may be included in communication system 1. The devices included in communication system 1 may be connected via network 50, which is the Internet.

1-1-2. Configuration of Communication Terminal 10

Figure 2:
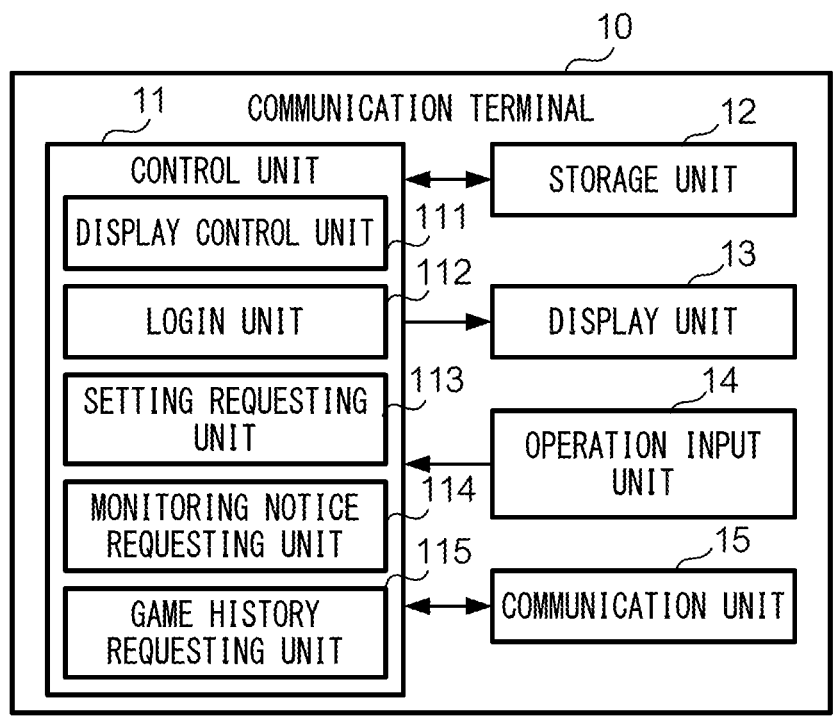
FIG. 2 is a diagram showing an example of a configuration of communication terminal 10.

Communication terminal 10, which is an example of a first communication terminal, is a portable computer device with a communication function, and is, specifically, a smartphone. It is of note that in a modification, communication terminal 10 may be a mobile terminal such as a mobile phone or a tablet device, or a stationary computer device. Communication terminal 10 is a terminal always connected to network 50; specifically, communication terminal 10, in an environment that enables connection to network 50, always remains connected to the network so that the communication terminal can communicate at any time. Communication terminal 10, without awaiting a user's explicit input operation for connecting, automatically connects to network 50 so that the user can access the network whenever s/he needs to, without attention to a connection status. FIG. 2 is a diagram showing a configuration of communication terminal 10, which includes control unit 11, storage unit 12, display unit 13, operation input unit 14, and communication unit 15. It is of note that in a modification, storage unit 12 may be an external storage medium.

Control unit 11 includes a processor such as a CPU or GPU, and a volatile memory, which unit executes programs, such as a monitoring program, stored in storage unit 12. The monitoring program is a program for enabling monitoring and restriction of use of game device 20; in other words, the monitoring program is a program for enabling parental control. Functions provided by execution of the monitoring program will be described later.

Storage unit 12 is a storage device such as a flash memory, which unit stores programs including the monitoring program, to be executed by control unit 11.

Display unit 13 is a display device such as a liquid crystal display or an organic electroluminescence (EL) display.

Operation input unit 14 is an input device such as a touch sensor placed on top of display unit 13, or a numeric keypad.

Communication unit 15 is a communication module for enabling Internet communication with setting management server 30. Internet communication herein refers to a communication method using TCP/IP as a communication protocol. Specifically, communication unit 15 connects to a base station in a mobile communication network, thereby communicating with setting management server 30 via network 50. Alternatively, communication unit 15 connects to a wireless LAN access point according to an IEEE802.11 standard such as IEEE802.11.b/g, thereby communicating with setting management server 30 via network 50.

Control unit 11, by executing the monitoring program stored in storage unit 12, provides functions of display control unit 111, login unit 112, setting requesting unit 113, monitoring notice requesting unit 114, and game history requesting unit 115.

Display control unit 111 causes display unit 13 to display screens and messages.

Login unit 112, when a user logs in to setting management server 30, sends the server account information including a user ID and password input by the user on a login screen.

Setting requesting unit 113, which is an example of a processing requesting unit, requests setting of a usage restriction on game device 20. Specifically, setting requesting unit 113 sends a setting request to setting management server 30, which request includes setting information on usage restrictions selected by the user on a play time setting screen and a restriction level setting screen, which screens will be described later, and a user ID of communication terminal 10.

Monitoring notice requesting unit 114, upon detecting that the user has permitted monitoring notification on a monitoring notice request screen (described later), sends a monitoring notice request including a user ID of communication terminal 10 to setting management server 30.

Game history requesting unit 115, which is an example of a processing requesting unit, in response to a user's input operation to request game device 20 to upload a game history, sends a game history request including a user ID of communication terminal 10 to setting management server 30.

1-1-3. Configuration of Game Device 20

Figures 3, 4, 6:
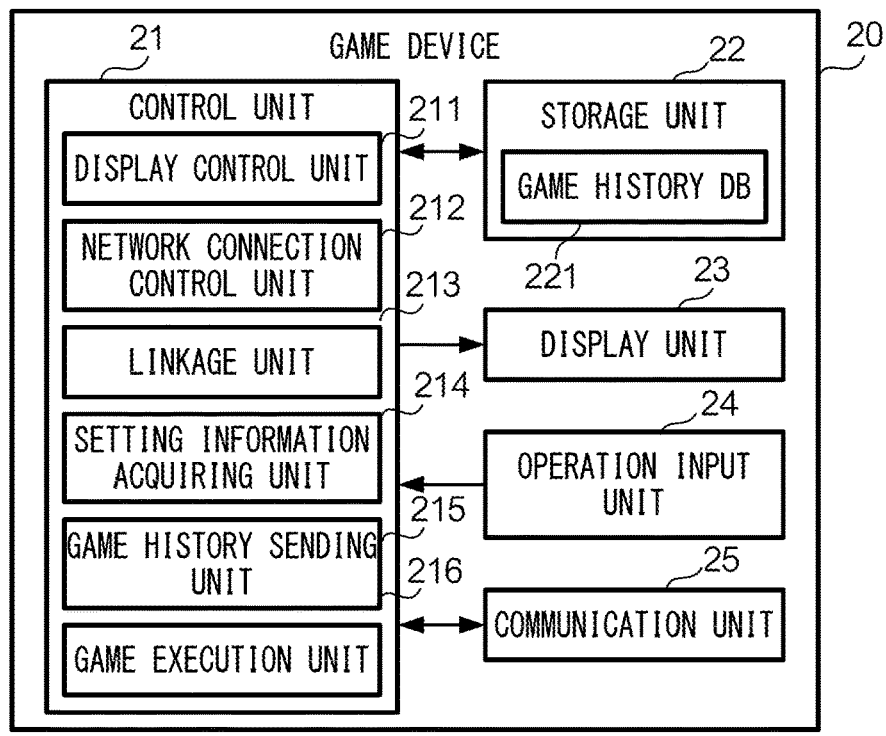
FIG. 3 is a diagram showing an example of a configuration of game device 20.
FIG. 4 is a diagram showing an example of game history DB 221.
FIG. 6 is a diagram showing an example of user information DB 321.

Game device 20, which is an example of a second communication terminal, is a portable computer game device with a communication function. It is of note that in a modification, game device 20 may be a stationary computer game device. Game device 20 is a terminal that is not always connected to network 50. In principle, game device 20 connects to network 50 in response to a user's explicit input operation requiring connection. Also, in a case where game device 20 automatically connects to network 50, without awaiting a user's input operation, the game device automatically terminates the connection to the network after executing processing that has triggered the connecting operation. FIG. 3 is a diagram showing an example of a configuration of game device 20, which includes control unit 21, storage unit 22, display unit 23, operation input unit 24, and communication unit 25. It is of note that in a modification, storage unit 22 may be an external storage medium.

Control unit 21 includes a processor such as a CPU or GPU, and a volatile memory, which unit executes programs stored in storage unit 22. Functions provided by control unit 21 through execution of a program will be described later.

Storage unit 22, which is an example of a second storage unit, is a storage device such as a flash memory, which unit stores programs to be executed by control unit 21. Programs stored in storage unit 22 include programs of different types of computer games, which may include, for example, an action game, a role playing game, or a puzzle game. It is of note that a computer game includes an application for learning.

Also, storage unit 22 stores information on settings of usage restrictions including a time restriction and a functional restriction for game device 20. The time restriction, specifically, refers to a restriction on a length of time a day for which a user can play games using game device 20. For example, a time restriction may be set in game device 20 so that a user can play games only for an hour a day, and an elapse of an hour triggers display of an alert. On the other hand, the functional restriction, specifically, refers to a restriction on the type or function of a program that can be executed. For example, a functional restriction may be set in game device 20 so that violent-game programs can not be executed, or that a function for enabling free communication with others or a function for enabling posting of a screen shot to a social networking service (SNS) is prohibited. The functional restrictions are classified into four restriction levels of child, elementary school kid, high or junior high school kid, and no setting.

In addition, storage unit 22 stores a game history database (DB) 221. FIG. 4 is a diagram showing an example of game history DB 221, which is a database for recording a history of games that a user of game device 20 has played on the game device. Game history DB 221 records a game ID that is identification information of a game, and a set of a game play start date and time and a game play end date and time in association with each other. It is of note that game history DB 221 may store, in addition to a history of games, a history of applications other than games that a user of game device 20 has executed on the game device. In such a case, game history DB 221 records an application ID that is identification information of an application, and a set of an application execution start date and time and an application execution end date and time in association with each other.

Now, display unit 23 is a display device such as a liquid crystal display or an organic EL display.

Operation input unit 24 is an input device such as a touch sensor placed on top of display unit 23, an arrow key, or an analog stick.

Communication unit 25 is a communication module for enabling Internet communication with setting management server 30 or notification server 40. Specifically, communication unit 25 connects to a wireless LAN access point according to an IEEE802.11 standard such as IEEE802.11.b/g, thereby communicating with setting management server 30 or notification server 40 via network 50.

Control unit 21, by executing a program stored in storage unit 22, provides functions of display control unit 211, network connection control unit 212, linkage unit 213, setting information acquiring unit 214, game history sending unit 215, and game execution unit 216.

Display control unit 211 causes display unit 23 to display screens and messages.

Network connection control unit 212 controls connection to network 50. Specifically, network connection control unit 212, in response to a user's instruction to connect to network 50, performs a network connecting operation. Also, network connection control unit 212, in response to a user's input operation for canceling a sleep mode (in other words, power saving mode) of game device 20, performs a network connecting operation. In that case, network connection control unit 212, after setting information acquiring unit 214 has reflected setting of usage restrictions, or game history sending unit 215 has sent game history information to setting management server 30, terminates the connection to network 50. Also, network connection control unit 212, upon detecting that game device 20 has entered a sleep mode and has temporarily come out of the sleep mode at predetermined intervals (for example, at two-hour intervals), performs a network connecting operation. In that case, network connection control unit 212, after setting information acquiring unit 214 has reflected setting of usage restrictions, or game history sending unit 215 has sent game history information to setting management server 30, terminates the connection to network 50.

Linkage unit 213 sends a registration code that has been input by a user on a registration code entry screen (described later) to setting management server 30, together with a device ID of game device 20. Also, linkage unit 213, on accepting a user's approval of linkage with communication terminal 10 on a linkage confirmation screen (described later), sends a linkage approval to setting management server 30, together with a device ID of game device 20.

Setting information acquiring unit 214, which is an example of a processing execution unit, on accepting setting information from setting management server 30, stores the received setting information in storage unit 22. When doing so, if storage unit 22 already stores setting information, setting information acquiring unit 214 updates the stored setting information with the received setting information. After storing the received setting information, setting information acquiring unit 214 sends a setting completion notice notifying that setting has been reflected, to setting management server 30, together with a device ID of game device 20. Setting information acquiring unit 214, to acquire setting information from setting management server 30, sends, on receipt of an instruction notice from notification server 40, a setting information request including a device ID of game device 20 to setting management server 30 in a situation where game device 20 is connected to network 50, a user has performed an input operation to cancel a sleep mode of the game device, or the game device has been powered on. On the other hand, in another situation where game device 20 has entered a sleep mode and temporarily come out from the sleep mode at predetermined intervals (for example, at two-hour intervals), or a user has provided an explicit instruction to acquire setting information, setting information acquiring unit 214 sends a setting information request including a device ID of game device 20 to setting management server 30, without awaiting an instruction notice from notification server 40.

Game history sending unit 215, which is an example of a processing execution unit, sends game history information stored in game history DB 221 to setting management server 30, together with a device ID of game device 20. When game device 20 is connected to network 50, game history sending unit 215 sends game history information to setting management server 30 at predetermined intervals (for example, at ten-minute intervals). Also, when game device 20 has entered a sleep mode and has temporarily come out of the sleep mode at predetermined intervals (for example, at two-hour intervals), or the game device has received an instruction notice from notification server 40, game history sending unit 215 sends game history information to setting management server 30.

Game execution unit 216 executes a game program stored in storage unit 22 with reference to information on settings of usage restrictions stored in the storage unit.

1-1-4. Configuration of Setting Management Server 30

Figures 5, 7, 8:
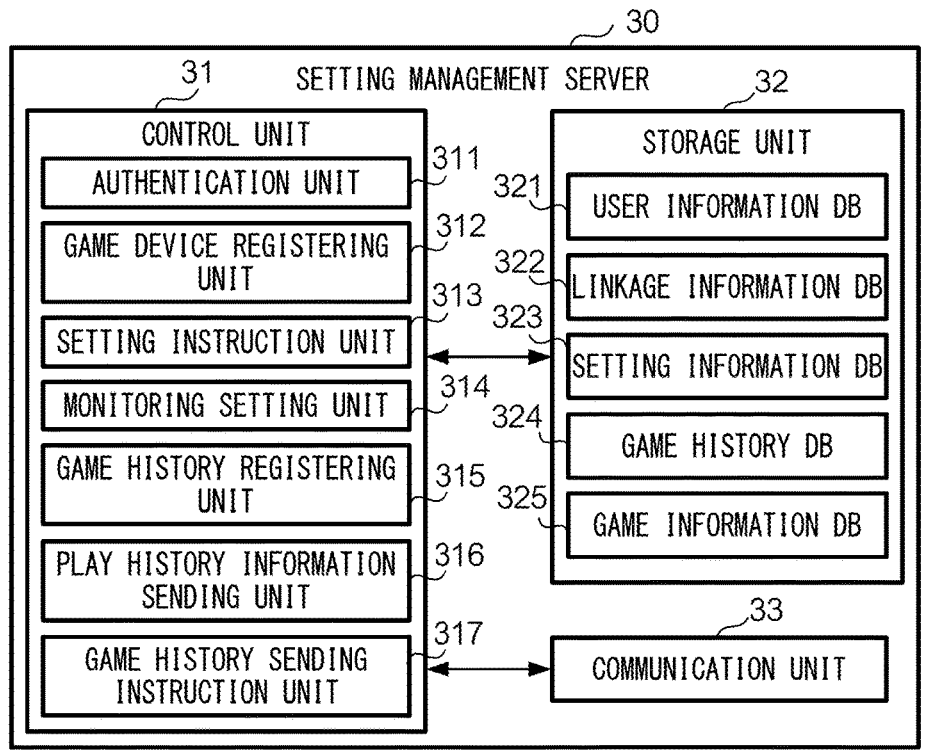
FIG. 5 is a diagram showing an example of setting management server 30.
FIG. 7 is a diagram showing an example of linkage information DB 322.
FIG. 8 is a diagram showing an example of setting information DB 323.

Setting management server 30, which is an example of a server device, is a computer device for providing a monitoring service that enables a user of communication terminal 10 to monitor and restrict use of game device 20; in other words, setting management server 30 is a computer device for providing a parental control service. FIG. 5 is a diagram showing an example of a configuration of setting management server 30, which includes control unit 31, storage unit 32, and communication unit 33. It is of note that in a modification, storage unit 32 may be an external storage device.

Control unit 31 includes a processor such as a CPU or GPU, and a volatile memory, which unit executes programs stored in storage unit 32. Functions provided by control unit 31 through execution of a program will be described later.

Storage unit 32, which is an example of a first storage unit, is a storage device such as a hard disk, which unit stores programs to be executed by control unit 31. Also, storage unit 32 stores user information DB 321, linkage information DB 322, setting information DB 323, game history DB 324, and game information DB 325.

FIG. 6 is a diagram showing an example of user information DB 321, which is a database for managing information on users of communication terminals 10. User information DB 321 records, in association with a user ID that is identification information of a user of communication terminal 10, a user name, a user image, and a password of the user. A user ID herein refers to, for example, an email address of communication terminal 10.

FIG. 7 is a diagram showing an example of linkage information DB 322, which is a database for managing links between communication terminal 10 and game device 20. Linkage information DB 322 records a user ID of a user of communication terminal 10, who monitors and restricts use of game device 20, and a device ID that is identification information of the game device in association with each other.

FIG. 8 is a diagram showing an example of setting information DB 323, which is a database for managing information on usage restrictions imposed on game devices 20. Setting information DB 323 records, in association with a device ID of game device 20, an acceptable daily play time, a restriction level, and a monitoring notice flag. A monitoring notice flag is information indicative of whether it is necessary to send, as a push notification, daily summary screen data and monthly summary screen data to communication terminal 10 linked to game device 20. Among the items of information stored in setting information DB 323, a play time and a restriction level are recorded in association with a reflection flag indicating whether setting has been reflected in game device 20.

Figures 9, 10, 11, 12:
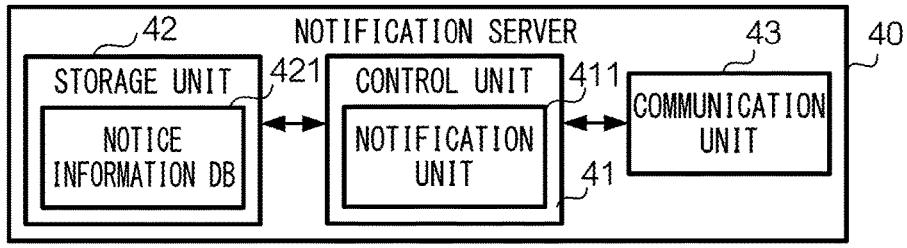
FIG. 9 is a diagram showing an example of game history DB 324.
FIG. 10 is a diagram showing an example of game information DB 325.
FIG. 11 is a diagram showing an example of a configuration of notification server 40.
FIG. 12 is a diagram showing an example of notice information DB 421.

FIG. 9 is a diagram showing an example of game history DB 324, which is a database for recording, for each of users of game devices 20, a history of games that a user has played on his/her game device 20. Game history DB 324 includes tables each of which is created for each of users of game device 20, and records a game ID of a game, and a set of a game play start date and time and a game play end date and time in association with each other. It is of note that game history DB 324 may record, in addition to a game history, a history of applications other than games, that a user of game device 20 has executed on his/her game device. In such a case, game history DB 324 records an application ID that is identification information of an application, and a set of an application execution start date and time and an application execution end date and time in association with each other.

FIG. 10 is a diagram showing an example of game information DB 325, which is a database for managing information on games. Game information DB 325 records, in association with a game ID of a game, a game name and a game image of the game. A game image herein refers to, for example, an image of a game play or an icon.

Now, communication unit 33 is a communication module for enabling Internet communication with communication terminal 10, game device 20, or notification server 40 via network 50.

Control unit 31, by executing a program stored in storage unit 32, provides functions of authentication unit 311, game device registering unit 312, setting instruction unit 313, monitoring setting unit 314, game history registering unit 315, play history information sending unit 316, and game history sending instruction unit 317.

Authentication unit 311, on accepting account information from communication terminal 10, conducts a user authentication with reference to user information DB 321.

Game device registering unit 312, after authentication unit 311 has authenticated a user of communication terminal 10, sends to the communication terminal a registration code, which is a six-digit random number. After that, on accepting a registration code from game device 20, game device registering unit 312 matches the accepted registration code to the registration code that has been sent to communication terminal 10. As a result of the matching, when the two registration codes agree with each other, game device registering unit 312 instructs communication terminal 10 to display an operation instruction screen to urge a user of the communication terminal to perform further input operations on game device 20. Also, game device registering unit 312 sends information on a user of communication terminal 10 to game device 20, which information is, specifically, a user name and a user image. After that, on accepting a linkage approval from game device 20, game device registering unit 312 registers a user ID of communication terminal 10 and a device ID of game device 20 in linkage information DB 322 in association with each other, thereby linking communication terminal 10 with game device 20. After linking the two devices, game device registering unit 312 instructs communication terminal 10 to display a screen notifying that the unit has registered game device 20, and also instructs the game device to display a screen notifying that the unit has linked the game device with the communication terminal.

Setting instruction unit 313, which is an example of a processing instruction unit, in response to a request from communication terminal 10 for setting of a use restriction on game device 20, instructs the game device to execute processing for setting the use restriction. Specifically, on accepting a setting request from communication terminal 10, setting instruction unit 313 identifies game device 20 linked to the communication terminal by referring to linkage information DB 322, to register, in association with a device ID of the identified game device and a reflection flag "NO," setting information included in the accepted setting request in setting information DB 323. After registering the setting information, setting instruction unit 313 sends a notice request to notification server 40, which request includes an instruction to reflect setting and the device ID of game device 20. After that, on accepting a setting information request from game device 20, setting instruction unit 313 acquires setting information from setting information DB 323, which information is associated with a device ID of the game device and a reflection flag "NO," to send the acquired setting information to the game device. After that, on accepting a setting completion notice from game device 20, setting instruction unit 313 updates a reflection flag associated with a device ID of the game device in setting information DB 323 from "NO" to "YES." After updating setting information DB 323, setting instruction unit 313 sends a setting completion notice notifying that setting has been reflected, to communication terminal 10 linked to game device 20.

Setting instruction unit 313, upon detecting that a predetermined time (for example, ten seconds) has elapsed after registration of setting information until setting is reflected, sends a setting incompletion notice notifying that setting has not been reflected to communication terminal 10 linked to game device 20. After that, upon detecting that another predetermined time (for example, one hour) has elapsed after the registration of setting information until setting is reflected, setting instruction unit 313 sends, as a push notification, a setting incompletion notice notifying that setting has not been reflected, to communication terminal 10 linked to game device 20.

Monitoring setting unit 314, on accepting a monitoring notice request from communication terminal 10, updates setting information DB 323 to set a notification flag to "YES" for game device 20 linked to the communication terminal.

Game history registering unit 315, on accepting game history information from game device 20, registers the game history information in game history DB 324 in association with a device ID of the game device.

Play history information sending unit 316 monitors a game history of game device 20 registered in linkage information DB 322, and upon detecting accumulation of a predetermined number of records, generates daily summary screen data by referring to setting information DB 323, game history DB 324, and game information DB 325. After generating the screen data, if game device 20 is associated with a monitoring notice flag "YES" in setting information DB 323, play history information sending unit 316 sends, as a push notification, the generated screen data to communication terminal 10 linked to the game device. Also, play history information sending unit 316 generates monthly summary screen data every month based on a game history of game device 20 registered in linkage information DB 322. After generating the screen data, if game device 20 is associated with a monitoring notice flag "YES" in setting information DB 323, play history information sending unit 316 sends, as a push notification, the generated screen data to communication terminal 10 linked to the game device.

Game history sending instruction unit 317, which is an example of a processing instruction unit, in response to a request from communication terminal 10 for uploading of a game history from game device 20, instructs the game device to execute processing for uploading a game history. Specifically, on accepting a game history request from communication terminal 10, game history sending instruction unit 317 identifies a device ID of game device 20 linked to the communication terminal by referring to linkage information DB 322, to send notification server 40 a notice request including the identified device ID and an instruction to upload a game history.

1-1-5. Configuration of Notification Server 40

Notification server 40 is a computer device for notifying game device 20 of instruction information sent from setting management server 30. FIG. 11 is a diagram showing an example of a configuration of notification server 40, which includes control unit 41, storage unit 42, and communication unit 43. It is of note that storage unit 42 may be an external storage device.

Control unit 41 includes a processor such as a CPU or GPU, and a volatile memory, which unit executes programs stored in storage unit 42. Functions provided by control unit 41 through execution of a program will be described later.

Storage unit 42 is a storage device such as a hard disk, which unit stores programs to be executed by control unit 41, and notice information DB 421.

FIG. 12 is a diagram showing an example of notice information DB 421, which is a database for managing instruction information notified by setting management server 30 to game devices 20. Notice information DB 421 records, in association with a device ID of game device 20, instruction information notified to the game device.

Communication unit 43 is a communication module for enabling Internet communication with game device 20 or setting management server 30 via network 50.

Control unit 41, by executing a program stored in storage unit 42, provides a function of notification unit 411.

Notification unit 411, on accepting a notice request from setting management server 30, registers instruction information and a device ID included in the notice request in notice information DB 421 in association with each other. After registering the items of information, notification unit 411 sends an instruction notice including the instruction information to game device 20 identified by the device ID.

1-2. Operation

Operations performed in communication system 1 will be described, which operations include an initial setting operation for a monitoring service, an operation for uploading a game history, and an operation for providing game play history information.

1-2-1. Initial Setting Operation for a Monitoring Service

Figure 13:
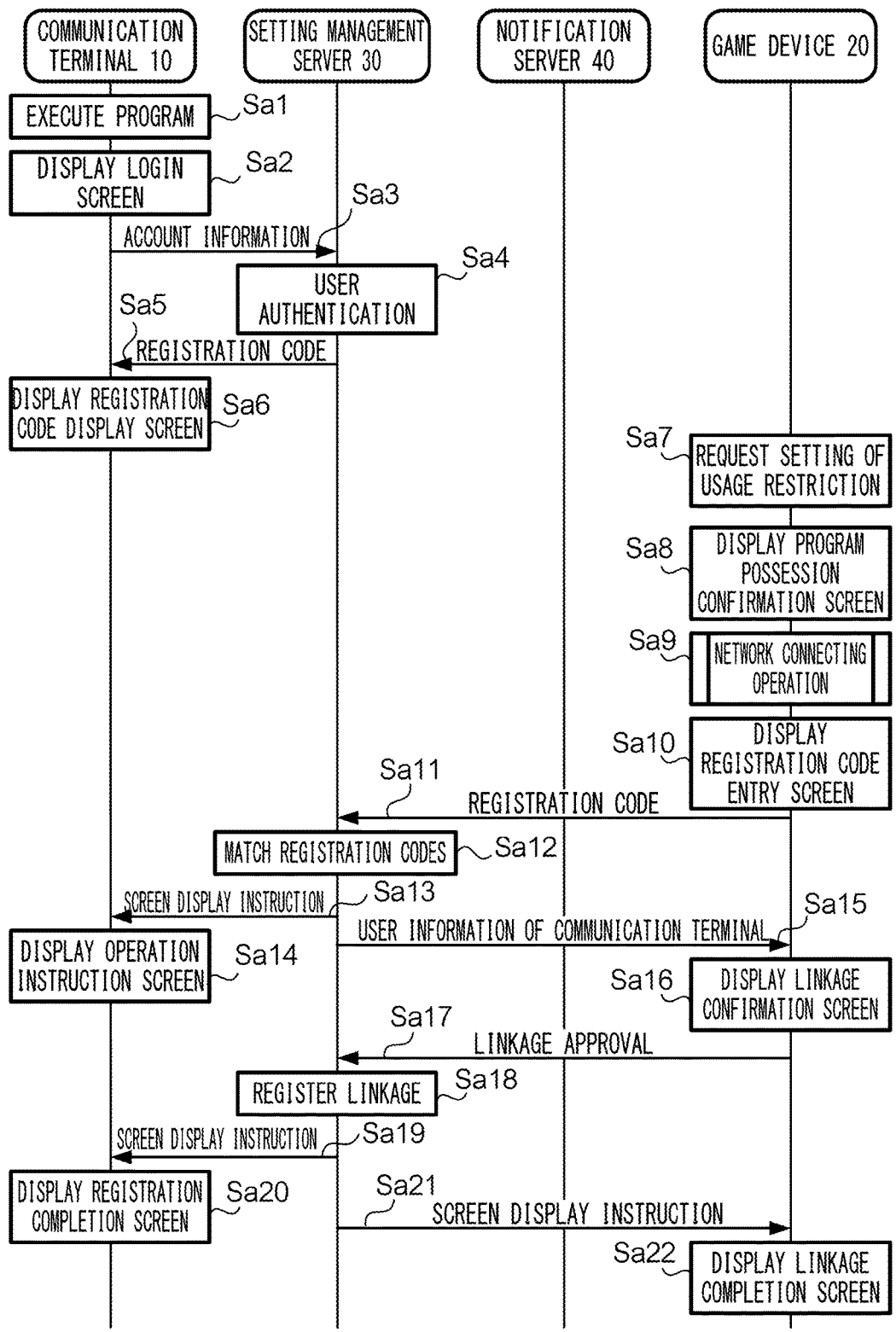
FIG. 13 is a sequence diagram showing an example of an initial setting operation for a monitoring service.
Figure 14:
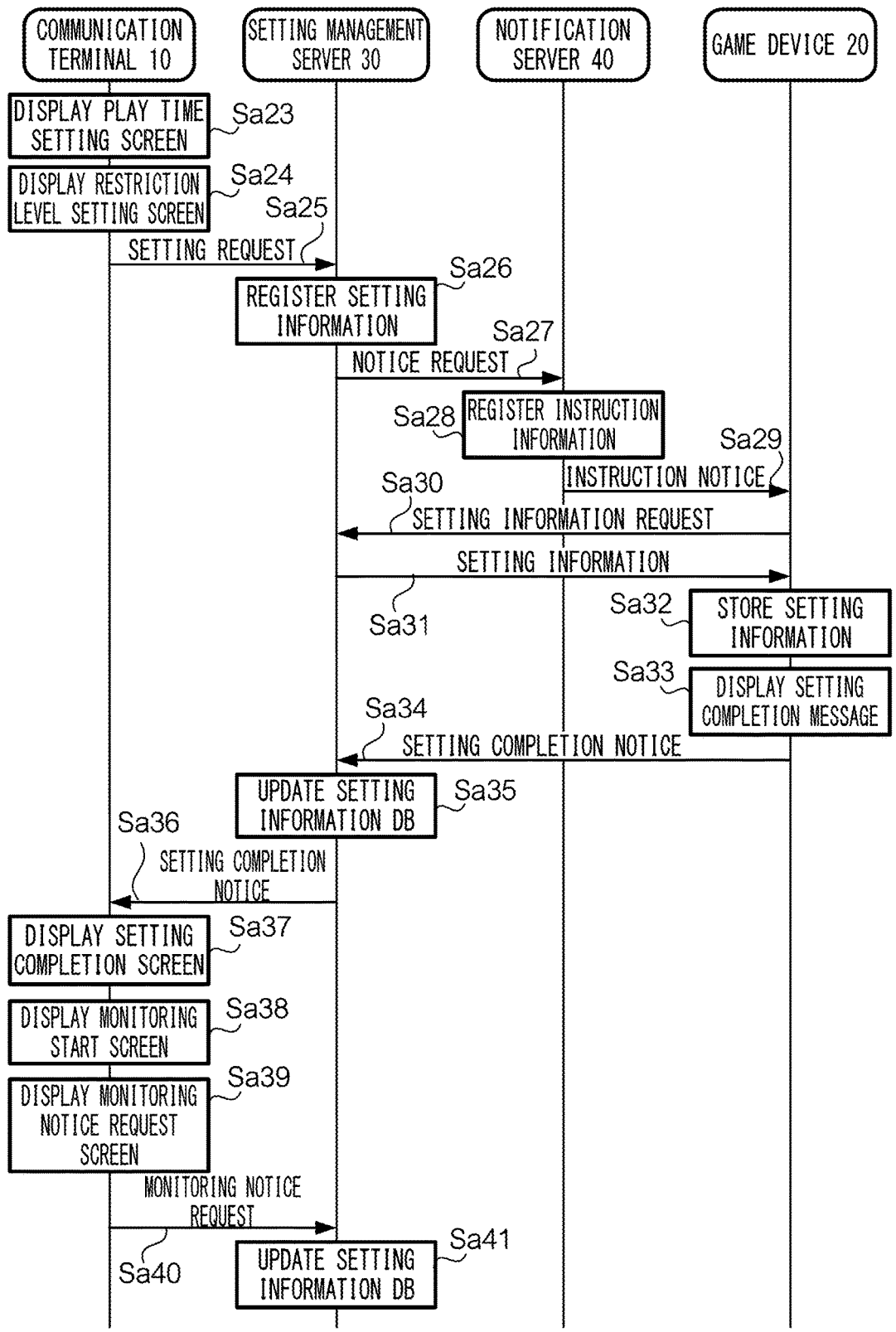
FIG. 14 is a sequence diagram showing an example of an initial setting operation for a monitoring service.

FIGS. 13 and 14 are sequence diagrams showing an example of an initial setting operation for a monitoring service.

When a user of communication terminal 10 inputs an instruction to execute the monitoring program stored in storage unit 12, so that the program runs on the communication terminal (step Sa1), display control unit 111 causes display unit 13 to display a login screen (step Sa2). When the user, on the login screen, inputs his/her user ID and password and selects a login button, login unit 112 sends account information including the input user ID and password to setting management server 30 (step Sa3).

On accepting the account information, authentication unit 311 of setting management server 30 conducts user authentication with reference to user information DB 321 (step Sa4). As a result of the user authentication, in a case where the accepted account information is registered in user information DB 321, game device registering unit 312 sends a registration code to communication terminal 10 (step Sa5). In a case where the accepted account information is not registered in user information DB 321, authentication unit 311 sends an error notification to communication terminal 10. It is of note that in a modification, the process of a user authentication may be executed by a login server that is provided separately from setting management server 30.

Figure 15:
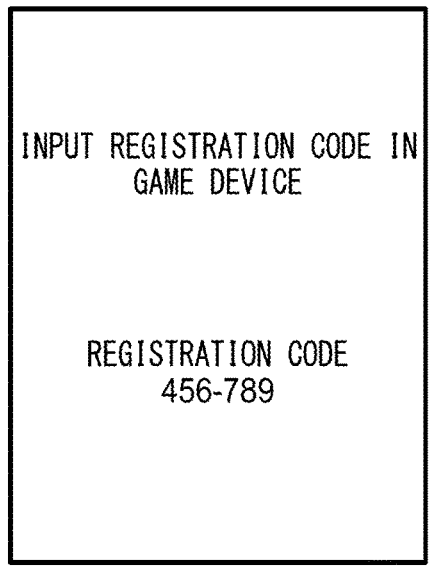
FIG. 15 is a diagram showing an example of a registration code display screen.

On accepting the registration code from setting management server 30, display control unit 111 of communication terminal 10 causes display unit 13 to display a registration code display screen (step Sa6). FIG. 15 is a diagram showing an example of the registration code display screen, which shows a registration code and a message that urges the user to input the registration code into game device 20.

Figure 16:
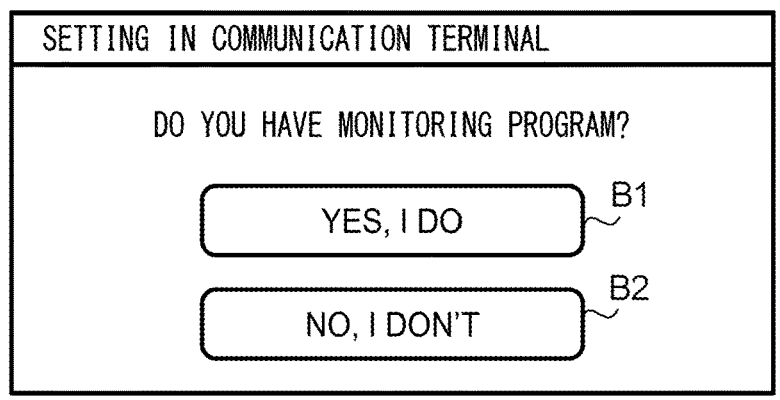
FIG. 16 is a diagram showing an example of a program possession confirmation screen.
Figure 17:
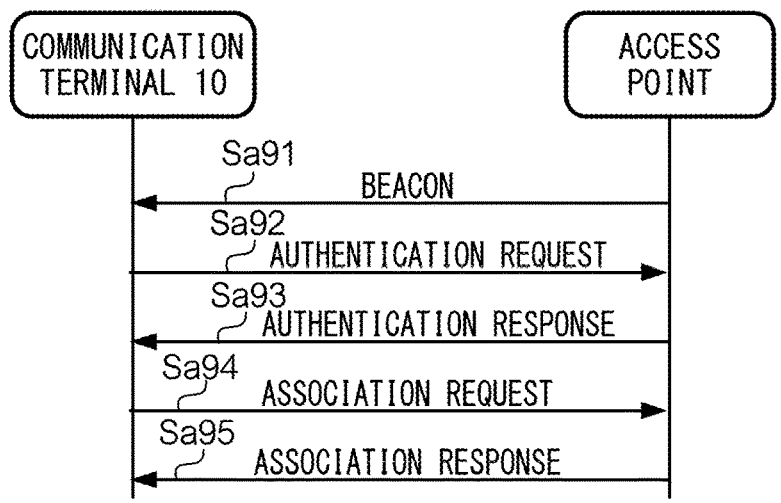
FIG. 17 is a sequence diagram showing an example of a network connecting operation.

When the user, responsive to a prompt displayed on the screen, inputs an instruction into game device 20 to request setting of usage restrictions using communication terminal 10 (step Sa7), display control unit 211 of the game device causes display unit 23 to display a program possession confirmation screen (step Sa8). FIG. 16 is a diagram showing an example of the program possession confirmation screen. When the user, on the program possession confirmation screen, selects "YES" button B1, network connection control unit 212 performs a network connecting operation (step Sa9). FIG. 17 is a sequence diagram showing an example of the network connecting operation.

Network connection control unit 212 initially acquires a beacon broadcast from an access point (step Sa91), and upon detecting that a network ID such as an ESS-ID, included in the acquired beacon agrees with a network ID preset in game device 20, sends an authentication request to the access point (step Sa92). On receiving the request, the access point sends an authentication response to game device 20 (step Sa93).

An authentication method available in the network connection operation may be, for example, an open system authentication or a shared key authentication. On acquiring the authentication response, network connection control unit 212 sends an association request to the access point (step Sa94). On receiving the request, the access point sends an association response to game device 20 (step Sa95). As a result, game device 20 is connected to network 50. It is of note that in a modification, network connection control unit 212, at step Sa91, may acquire the network ID of the access point by sending a probe request to the access point to acquire a probe response sent from the access point.

Figure 18:
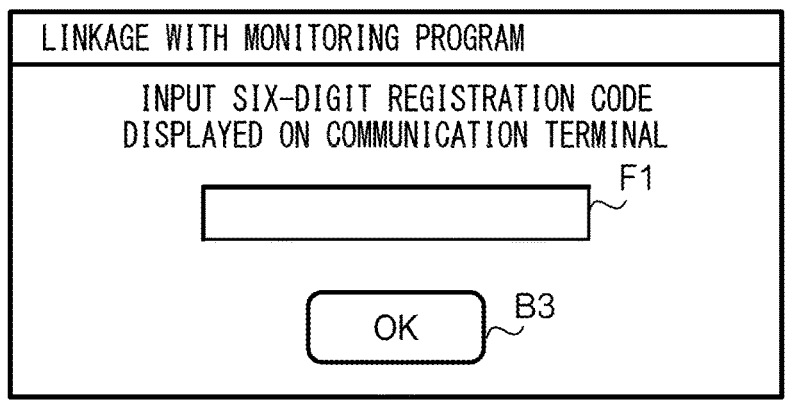
FIG. 18 is a diagram showing an example of a registration code entry screen.

After game device 20 is connected to network 50, display control unit 211 of the game device causes display unit 23 to display a registration code entry screen (step Sa10). FIG. 18 is a diagram showing an example of the registration code entry screen. When the user inputs, in input field F1 shown on the screen, the registration code displayed on communication terminal 10 at step Sa6, and selects OK button B3, linkage unit 213 sends the input registration code to setting management server 30, together with a device ID of game device 20 (step Sa11).

Figure 19:
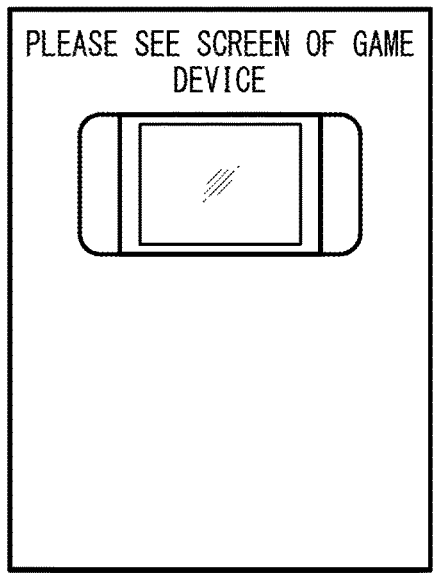
FIG. 19 is a diagram showing an example of an operation instruction screen.
Figure 20:
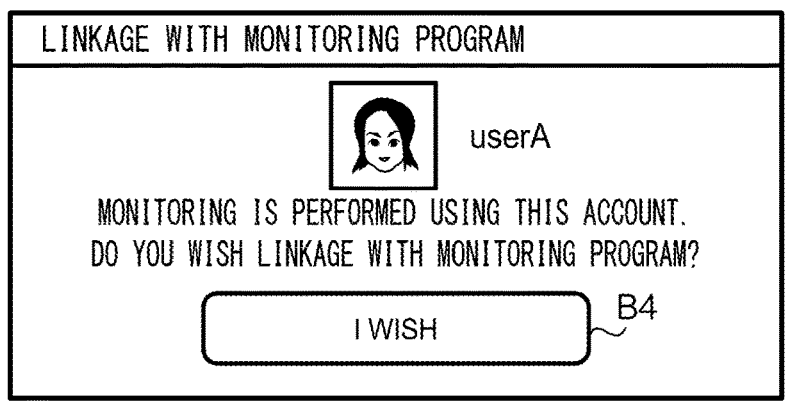
FIG. 20 is a diagram showing an example of a linkage confirmation screen.

On accepting the registration code, game device registering unit 312 of setting management server 30 matches the registration code to the registration code that the unit sent to communication terminal 10 at step Sa5 (step Sa12). As a result of the matching, when the two registration codes agree with each other, game device registering unit 312 instructs communication terminal 10 to display an operation instruction screen to urge the user of the communication terminal to perform further input operations on game device 20 (step Sa13). In response to the instruction, display control unit 111 of communication terminal 10 causes display unit 13 to display an operation instruction screen (step Sa14). FIG. 19 is a diagram showing an example of the operation instruction screen. Also, game device registering unit 312 sends information on the user of communication terminal 10 to game device 20, which information is, specifically, a user name and a user image (step Sa15). On accepting the user information, display control unit 211 of game device 20 causes display unit 23 to display a linkage confirmation screen (step Sa16). FIG. 20 is a diagram showing an example of the linkage confirmation screen, which shows information on the user of communication terminal 10 and linkage confirmation button B4. It is of note that as a result of the matching performed at step Sa12, when the two registration codes do not agree with each other, game device registering unit 312 sends an error notification to game device 20. It is also of note that when a predetermined time (for example, 15 minutes) has elapsed after the registration code is sent to communication terminal 10 (step Sa5) until registration codes agree with each other, game device registering unit 312 notifies the communication terminal that the registration code has expired.

When the user, on the linkage confirmation screen, selects linkage confirmation button B4, linkage unit 213 sends a linkage approval to setting management server 30, together with a device ID of game device 20 (step Sa17). On accepting the linkage approval, game device registering unit 312 of setting management server 30 registers the user ID of communication terminal 10 and the device ID of game device 20 in linkage information DB 322 in association with each other (step Sa18), thereby linking communication terminal 10 with game device 20. It is of note that when a predetermined time (for example, one hour) has elapsed after game device registering unit 312 has instructed communication terminal 10 to display the operation instruction screen (step Sa13) until a linkage approval is accepted, the unit notifies the communication terminal that the registration code has expired.

Figure 21:
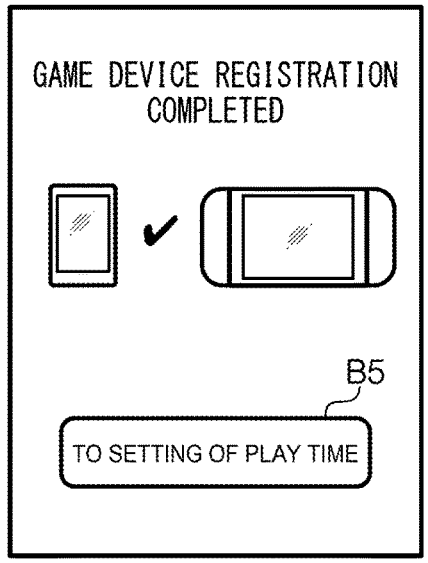
FIG. 21 is a diagram showing an example of a registration completion screen.
Figure 22:
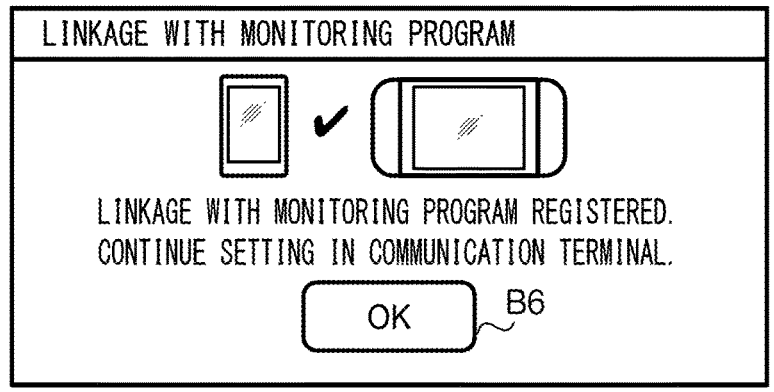
FIG. 22 is a diagram showing an example of a linkage completion screen.

After linking the two devices, game device registering unit 312 instructs communication terminal 10 to display a screen notifying that the unit has registered game device 20 (step Sa19). In response to the instruction, display control unit 111 of communication terminal 10 causes display unit 13 to display the registration completion screen (step Sa20). FIG. 21 is a diagram showing an example of the registration completion screen, which shows a message notifying that game device 20 has been registered, and screen transition button B5, by use of which the user can cause a play time setting screen to be displayed. Also, game device registering unit 312 instructs game device 20 to display a screen notifying that the unit has linked the game device with communication terminal 10 (step Sa21). In response to the instruction, display control unit 211 of game device 20 causes display unit 23 to display the linkage completion screen (step Sa22). FIG. 22 is a diagram showing an example of the linkage completion screen, which shows a message notifying that game device 20 has been linked to communication terminal 10, a message urging the user to perform further input operations on the communication terminal, and screen transition button B6, by use of which the user can cause a menu screen to be displayed.

Figure 23:
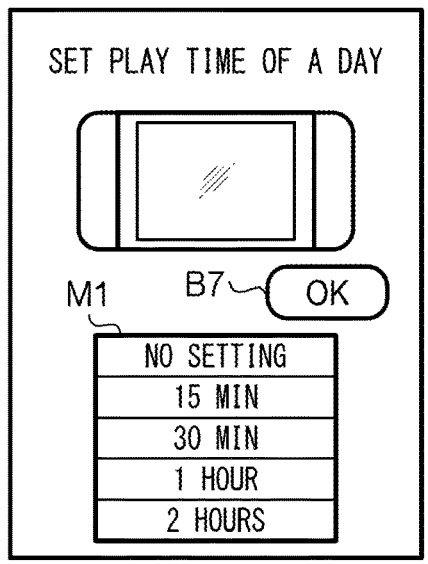
FIG. 23 is a diagram showing an example of a play time setting screen.

When the user, on the registration completion screen shown in FIG. 21, selects screen transition button B5, display control unit 111 of communication terminal 10 causes display unit 13 to display the play time setting screen (step S23). FIG. 23 is a diagram showing an example of the play time setting screen, which shows selection menu M1, from which the user can select a play time, and confirmation button B7, by use of which the user can fix selection of a play time. When the user, on the play time setting screen, selects a play time and selects confirmation button B7, display control unit 111 causes display unit 13 to display a restriction level setting screen (step Sa24). FIG. 24 is a diagram showing an example of the restriction level setting screen, which shows selection menu M2, from which the user can select a restriction level, and confirmation button B8, by use of which the user can fix selection of a restriction level. When the user, on the restriction level setting screen, selects a restriction level and selects confirmation button B8, setting requesting unit 113 sends a setting request to setting management server 30, which request includes information on settings selected on the play time setting screen and the restriction level setting screen, and the user ID of communication terminal 10 (step Sa25). It is of note that display of the restriction level setting screen may be omitted in a situation where a restriction level is already set in game device 20.

On accepting the setting request from communication terminal 10, setting instruction unit 313 of setting management server 30 identifies game device 20 linked to the communication terminal by referring to linkage information DB 322, to register, in association with a device ID of the identified game device and a reflection flag "NO," setting information included in the accepted setting request in setting information DB 323 (step Sa26). After registering the setting information, setting instruction unit 313 sends a notice request to notification server 40, which request includes an instruction to reflect setting and the device ID of game device 20 (step Sa27).

On accepting the notice request, notification unit 411 of notification server 40 registers instruction information and the device ID included in the notice request in notice information DB 421 in association with each other (step Sa28). After registering the items of information, notification unit 411 sends an instruction notice including the instruction information to game device 20 identified by the device ID (step Sa29). It is of note that notification server 40 may send the instruction notice to game device 20 after confirming that the game device is still online by accessing a server (not shown) that manages connection statuses of game devices 20. On accepting the instruction notice from notification server 40, setting information acquiring unit 214 of game device 20 sends a setting information request including the device ID of the game device to setting management server 30 (step Sa30).

On accepting the setting information request, setting instruction unit 313 of setting management server 30 acquires setting information from setting information DB 323, which information is associated with the received device ID and a reflection flag "NO," to send the acquired setting information to game device 20 (step Sa31).

On accepting the setting information, setting information acquiring unit 214 of game device 20 stores the received setting information in storage unit 22 (step Sa32). When doing so, if storage unit 22 already stores setting information, setting information acquiring unit 214 updates the stored setting information with the received setting information. After the setting information is stored, display control unit 211 causes display unit 23 to display a message notifying that setting has been reflected (step Sa33). Also, setting information acquiring unit 214 sends a setting completion notice notifying that setting has been reflected, to setting management server 30, together with the device ID of game device 20 (step Sa34).

On accepting the setting completion notice, setting instruction unit 313 of setting management server 30 updates a reflection flag associated with the received device ID in setting information DB 323 from "NO" to "YES" (step Sa35). After updating setting information DB 323, setting instruction unit 313 sends a setting completion notice notifying that setting has been reflected in communication terminal 10 linked to game device 20 (step Sa36). On accepting the setting completion notice, display control unit 111 of communication terminal 10 causes display unit 13 to display a setting completion screen (step Sa37). FIG. 25 is a diagram showing an example of the setting completion screen.

After the setting completion screen has been displayed, when the user performs an input operation to start monitoring of game device 20, display control unit 111 causes display unit 13 to display a monitoring start screen (step Sa38). FIG. 26 is a diagram showing an example of the monitoring start screen, which shows monitoring start button B9. In response to a user's selection of the button, display control unit 111 causes display unit 13 to display a monitoring notice request screen (step Sa39). FIG. 27 is a diagram showing an example of the monitoring notice request screen, which shows do-not-permit button B10, by use of which the user can reject a monitoring notice, and permit button B11, by use of which the user can permit a monitoring notice. When the user, on the monitoring notice request screen, selects permit button B11, monitoring notice requesting unit 114 sends a monitoring notice request including the user ID of communication terminal 10 to setting management server 30 (step Sa40).

On accepting the monitoring notice request, monitoring setting unit 314 of setting management server 30 updates setting information DB 323 to set a notification flag to "YES" for game device 20 linked to communication terminal 10 (step Sa41).

The foregoing is a description of the initial setting operation for a monitoring service.

Figures 28, 29, 30:
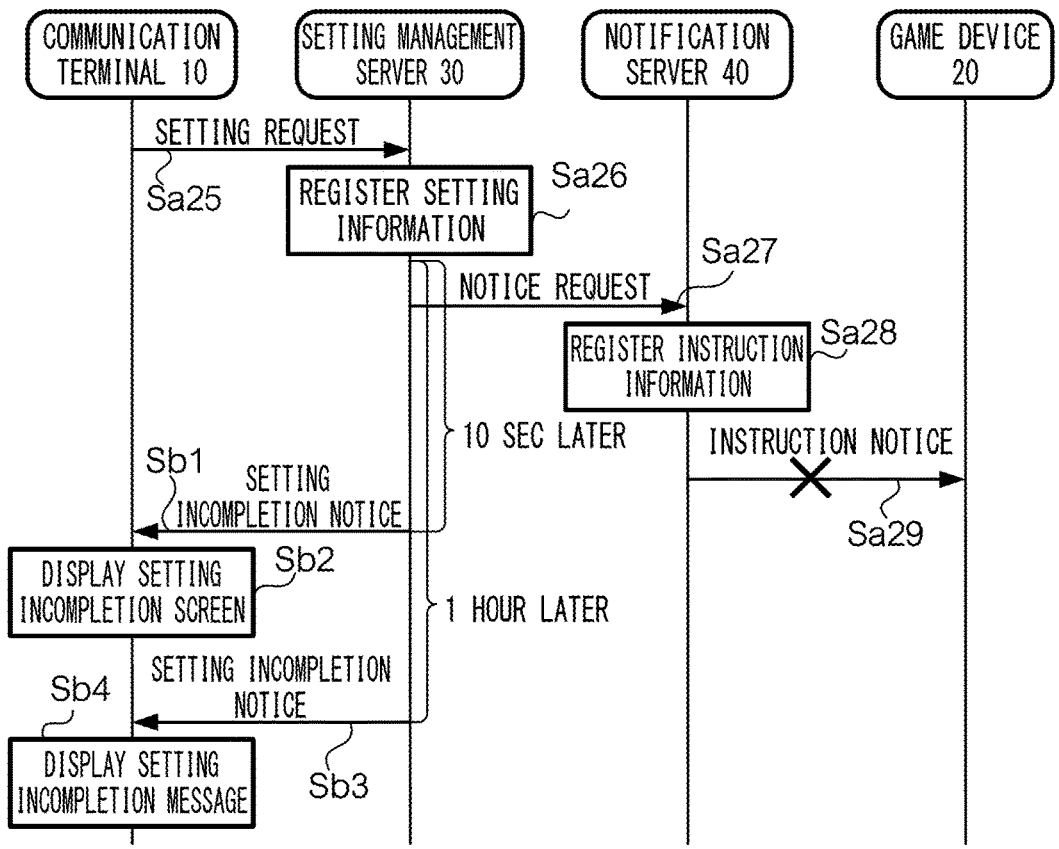
FIG. 28 is a sequence diagram showing an example of an initial setting operation for a monitoring service.
FIG. 29 is a diagram showing an example of a setting incompletion screen.
FIG. 30 is a diagram showing an example of a setting incompletion message.

Now, a case will be described in which, in the above operation, game device 20, to which the instruction notice is sent by notification server 40, is not connected to network 50. FIG. 28 is a sequence diagram showing an example of an operation performed in communication system 1 in such a case.

Notification unit 411 of notification server 40, in a case where game device 20 is not connected to network 50, cannot make the instruction notice available to the game device (step Sa29); accordingly, the game device does not send the setting information request to setting management server 30. In that case, setting instruction unit 313 of setting management server 30, when a predetermined time (for example, ten seconds) has elapsed after the registration of setting information (step Sa26) until setting is reflected, sends a setting incompletion notice notifying that setting has not been reflected, to communication terminal 10 linked to game device 20 (step Sb1). On accepting the notice, display control unit 111 of communication terminal 10 causes display unit 13 to display a setting incompletion screen (step Sb2). FIG. 29 is a diagram showing an example of the setting incompletion screen. After the screen is displayed, when the user performs an input operation to start monitoring of game device 20, display control unit 111 causes display unit 13 to display the monitoring start screen (step Sa38). Subsequent operations are as described above.

After the registration of setting information (step Sa26), upon detecting that another predetermined time (for example, one hour) has elapsed until setting is reflected, setting instruction unit 313 of setting management server 30 sends, as a push notification, a setting incompletion notice notifying that setting has not been reflected, to communication terminal 10 linked to game device 20 (step Sb3). On receiving the notice, communication terminal 10, if the monitoring program is not running, causes the program to run so that display control unit 111 causes display unit 13 to display a setting incompletion message (step Sb4). FIG. 30 is a diagram showing an example of the setting incompletion message.

The foregoing is a description of a case in which, in the above initial setting operation for a monitoring service, game device 20 is not connected to network 50.

Figure 31:
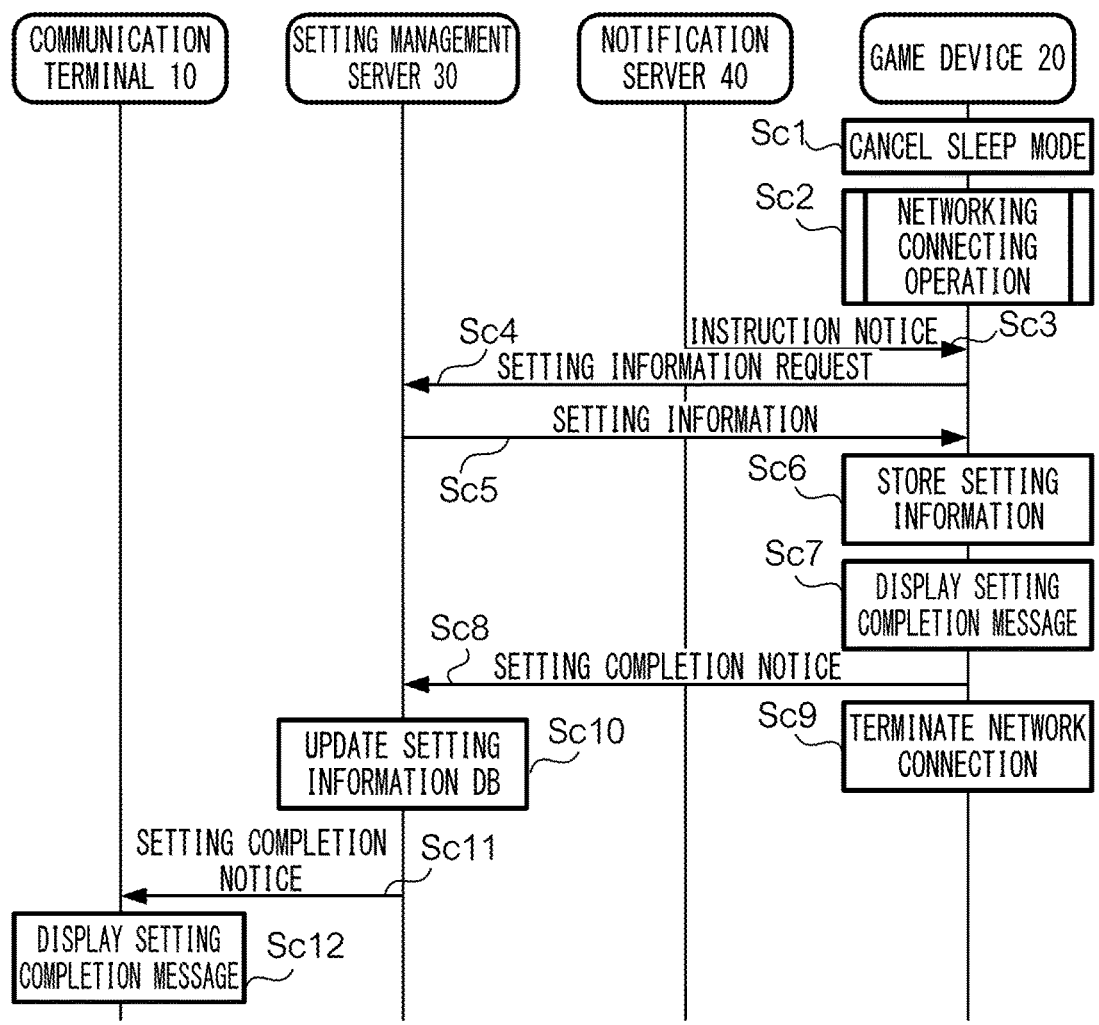
FIG. 31 is a sequence diagram showing an example of an initial setting operation for a monitoring service.

Now, a case will be described in which, in the above operation shown in FIG. 28, game device 20 has connected to network 50 after the setting incompletion screen has been displayed on communication terminal 10, which connection to the network is triggered by a user's input operation to cancel a sleep mode of the game device. FIG. 31 is a sequence diagram showing an example of an operation performed in communication system 1 in such a case.

When the user of game device 20 performs an input operation to cancel a sleep mode of the game device (step Sc1), network connection control unit 212 of the game device performs a network connecting operation (step Sc2), the procedure of which is similar to that of step Sa9 described above.

After game device 20 is connected to network 50, notification unit 411 of notification server 40, by referring to notice information DB 421, sends an instruction notice including the instruction information associated with the device ID of the game device to the game device (step Sc3).

On accepting the instruction notice, setting information acquiring unit 214 of game device 20 sends a setting information request including the device ID of the game device to setting management server 30 (step Sc4). On accepting the setting information request, setting instruction unit 313 of setting management server 30 acquires setting information from setting information DB 323, which information is associated with the received device ID and a reflection flag "NO," to send the acquired setting information to game device 20 (step Sc5).

On accepting the setting information, setting information acquiring unit 214 of game device 20 stores the received setting information in storage unit 22 (step Sc6). When doing so, if storage unit 22 already stores setting information, setting information acquiring unit 214 updates the stored setting information with the received setting information. After the setting information is stored, display control unit 211 causes display unit 23 to display a message notifying that setting has been reflected (step Sc7). Also, setting information acquiring unit 214 sends a setting completion notice notifying that setting has been reflected, to setting management server 30, together with the device ID of game device 20 (step Sc8). After the setting completion notice is sent, network connection control unit 212 terminates the connection to network 50 (step Sc9); specifically, the connection control unit terminates the connection by sending a disassociation request to an access point to which the game device 20 is connected, and receiving a disassociation response from the access point.

Figure 32:
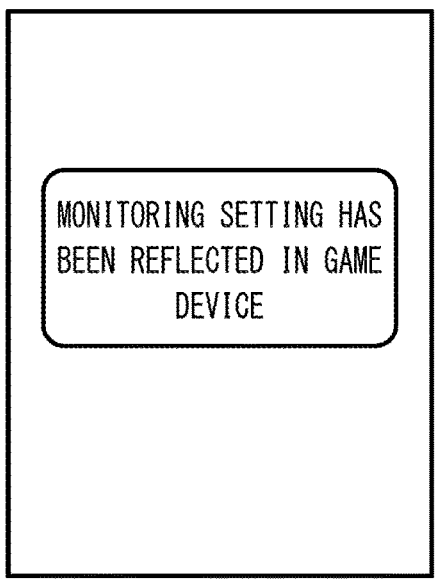
FIG. 32 is a diagram showing an example of a setting completion message.

On accepting the setting completion notice from game device 20, setting instruction unit 313 of setting management server 30 updates a reflection flag associated with the received device ID in setting information DB 323 from "NO" to "YES" (step Sc10). After updating setting information DB 323, setting instruction unit 313 sends, as a push notification, a setting completion notice notifying that setting has been reflected, to communication terminal 10 linked to game device 20 (step Sc11). On receiving the setting completion notice, communication terminal 10, if the monitoring program is not running, causes the program to run so that display control unit 111 causes display unit 13 to display a setting completion screen (step Sc12). FIG. 32 is a diagram showing an example of the setting completion screen.

The foregoing is a description of a case in which, in the above operation shown in FIG. 28, game device 20 has subsequently connected to network 50.

It is of note that the above steps Sc2 to Sc12 are carried out in response to not only cancellation of a sleep mode but also power activation of game device 20.

Figure 33:
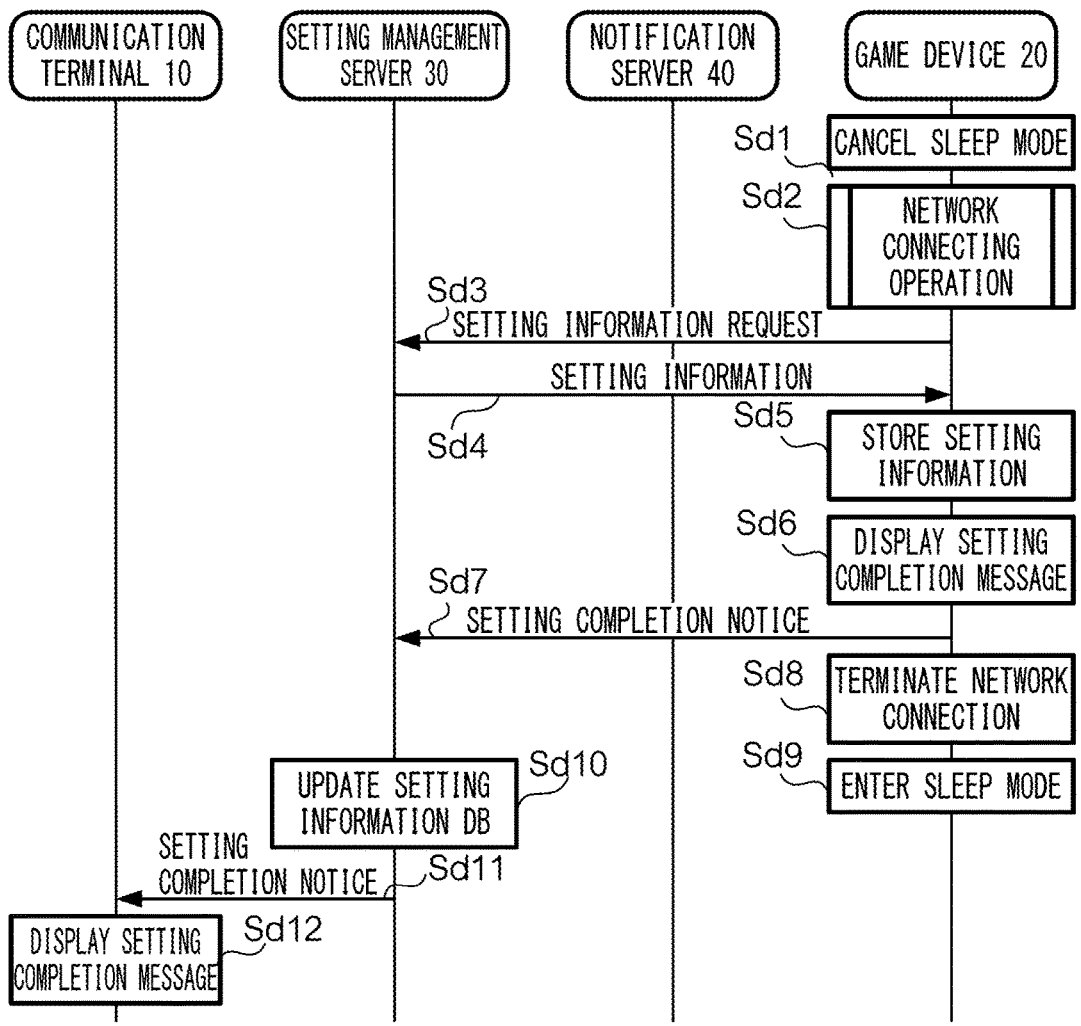
FIG. 33 is a sequence diagram showing an example of an initial setting operation for a monitoring service.

Now, another case will be described in which, in the above operation shown in FIG. 28, game device 20 has connected to network 50 after the setting incompletion screen is displayed on communication terminal 10. Specifically, a case will be described in which game device 20 has automatically connected to network 50 during a sleep mode at predetermined intervals (for example, at two-hour intervals). FIG. 33 is a sequence diagram showing an example of an operation performed in communication system 1 in such a case.

Game device 20, after having entered a sleep mode, temporarily comes out of the sleep mode at predetermined intervals (for example, at two-hour intervals) (step Sd1). When game device 20 has come out of the sleep mode, network connection control unit 212 of the game device performs a network connecting operation (step Sd2), the procedure of which is similar to that of step Sa9 described above.

After game device 20 is connected to network 50, setting information acquiring unit 214 of the game device sends a setting information request including the device ID of the game device to setting management server 30 (step Sd3). On accepting the setting information request, setting instruction unit 313 of setting management server 30 acquires setting information from setting information DB 323, which information is associated with the received device ID and a reflection flag "NO," to send the acquired setting information to game device 20 (step Sd4).

On accepting the setting information, setting information acquiring unit 214 of game device 20 stores the received setting information in storage unit 22 (step Sd5). When doing so, if storage unit 22 already stores setting information, setting information acquiring unit 214 updates the stored setting information with the received setting information. After the setting information is stored, display control unit 211 causes display unit 23 to display a message notifying that setting has been reflected (step Sd6). Also, setting information acquiring unit 214 sends a setting completion notice notifying that setting has been reflected, to setting management server 30, together with the device ID of game device 20 (step Sd7). After the setting completion notice is sent, network connection control unit 212 terminates the connection to network 50 (step Sd8), the procedure of which operation is similar to that of step Sc9 described above. After that, game device 20 returns to a sleep mode (step Sd9).

On accepting the setting completion notice from game device 20, setting instruction unit 313 of setting management server 30 updates a reflection flag associated with the received device ID in setting information DB 323 from "NO" to "YES" (step Sd10). After updating setting information DB 323, setting instruction unit 313 sends, as a push notification, a setting completion notice notifying that setting has been reflected, to communication terminal 10 linked to game device 20 (step Sd11). On receiving the setting completion notice, communication terminal 10, if the monitoring program is not running, causes the program to run so that display control unit 111 causes display unit 13 to display a setting completion screen (step Sd12), which is shown in FIG. 32.

The foregoing is a description of another case in which, in the above operation shown in FIG. 28, game device 20 has subsequently connected to network 50.

It is of note that the above steps Sd2 to Sd12 are carried out in response to not only periodical cancellation of a sleep mode but also user's explicit instruction to acquire setting information.

1-2-2. Operation for Uploading a Game History

Figure 34:
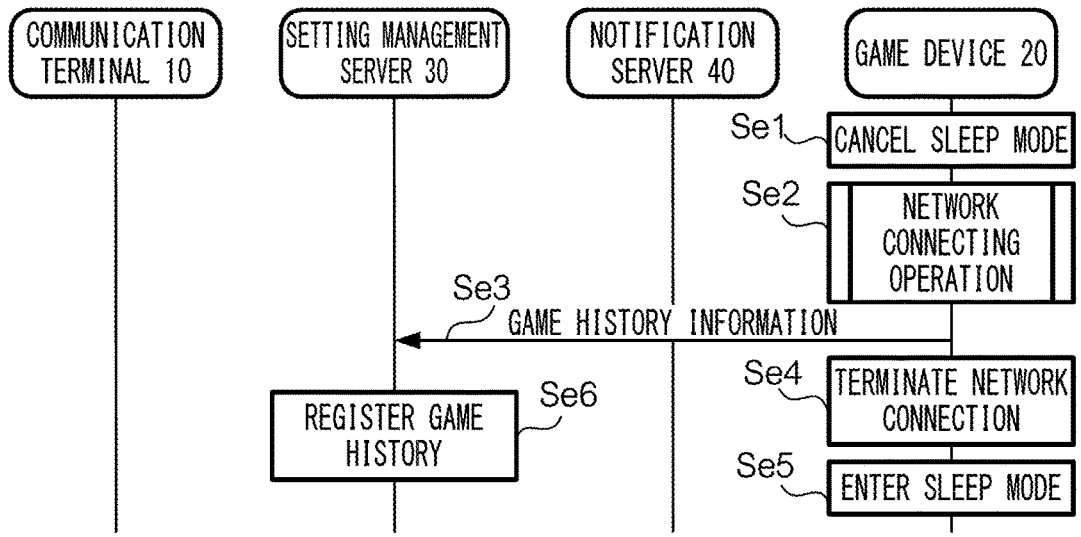
FIG. 34 is a sequence diagram showing an example of an operation for uploading a game history.

FIG. 34 is a sequence diagram showing an example of an operation for uploading a game history, which operation is automatically performed at a predetermined timing during a sleep mode of game device 20.

Game device 20, after having entered a sleep mode, temporarily comes out of the sleep mode at predetermined intervals (for example, at two-hour intervals) (step Se1). When game device 20 has come out of the sleep mode, network connection control unit 212 of the game device performs a network connecting operation (step Se2), the procedure of which is similar to that of step Sa9 described above. After game device 20 is connected to network 50, game history sending unit 215 of the game device sends game history information stored in game history DB 221 to setting management server 30, together with the device ID of game device 20 (step Se3). After the game history information has been sent, network connection control unit 212 terminates the connection to network 50 (step Se4), the procedure of which operation is similar to that of step Sc9 described above. After that, game device 20 returns to the sleep mode (step Se5).

On accepting the game history information from game device 20, game history registering unit 315 of setting management server 30 registers the game history information in game history DB 324 in association with the device ID of the game device (step Se6).

The foregoing is a description of the operation for uploading a game history.

Figure 35:
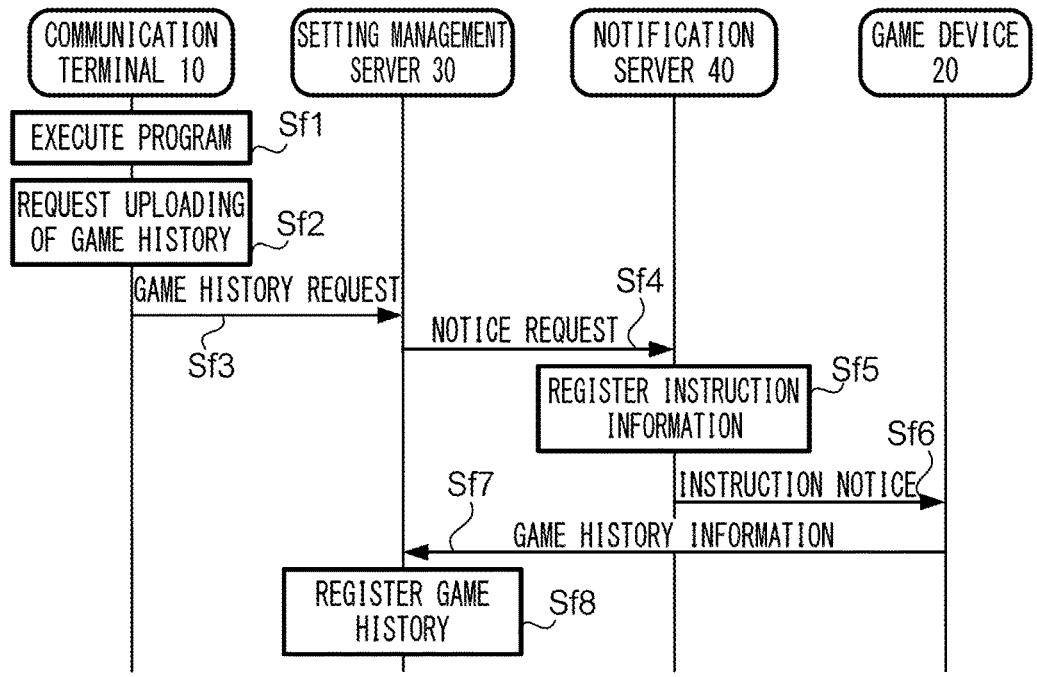
FIG. 35 is a sequence diagram showing an example of an operation for uploading a game history.

Now, another operation for uploading a game history will be described, in which operation, a request from communication terminal 10 triggers uploading of a game history. FIG. 35 is a sequence diagram showing an example of such an operation.

When a user of communication terminal 10 inputs an instruction to execute the monitoring program stored in storage unit 12 (step Sf1), and thereafter performs an input operation to request game device 20 to upload a game history (step Sf2), game history requesting unit 115 of the communication terminal sends a game history request including a user ID of the communication terminal to setting management server 30 (step Sf3).

On accepting the game history request, game history sending instruction unit 317 of setting management server 30 identifies a device ID of game device 20 linked to communication terminal 10 by referring to linkage information DB 322, to send notification server 40 a notice request including the identified device ID and an instruction to upload a game history (step Sf4).

On accepting the notice request, notification unit 411 of notification server 40 registers instruction information and the device ID included in the notice request in notice information DB 421 in association with each other (step Sf5). After registering the items of information, notification unit 411 sends an instruction notice including the instruction information to game device 20 identified by the device ID (step Sf6). On accepting the instruction notice, game history sending unit 215 of game device 20 sends game history information stored in game history DB 221 to setting management server 30, together with the device ID of game device 20 (step Sf7).

On accepting the game history information, game history registering unit 315 of setting management server 30 registers the game history information in game history DB 324 in association with the device ID of game device 20 (step Sf8).

The foregoing is a description of another operation for uploading a game history.

Figure 36:
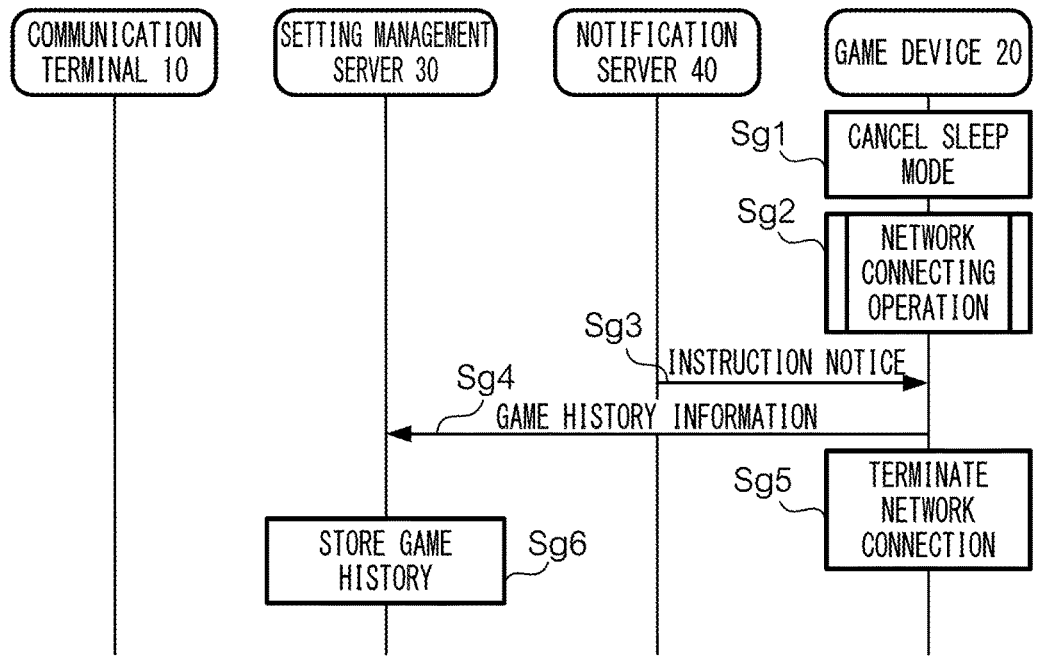
FIG. 36 is a sequence diagram showing an example of an operation for uploading a game history.

Now, a case will be described in which, in the above operation shown in FIG. 35, game device 20, which was not connected to network 50 whereby it failed to receive the instruction notice from game device 20, has connected to the network later, the connection to the network having been triggered by a user's input operation to cancel a sleep mode of the game device. FIG. 36 is a sequence diagram showing an example of an operation performed in communication system 1 in such a case.

When the user of game device 20 has performed an input operation to cancel a sleep mode of the game device (step Sg1), network connection control unit 212 of the game device performs a network connecting operation (step Sg2), the procedure of which is similar to that of step Sa9 described above.

After game device 20 is connected to network 50, notification unit 411 of notification server 40, by referring to notice information DB 421, sends an instruction notice including the instruction information associated with the device ID of the game device to the game device (step Sg3). On accepting the instruction notice, game history sending unit 215 of game device 20 sends game history information stored in game history DB 221 to setting management server 30, together with the device ID of game device 20 (step Sg4). After the game history information is sent, network connection control unit 212 terminates the connection to network 50 (step Sg5), which operation is similar to that of step Sc9 described above.

On accepting the game history information from game device 20, game history registering unit 315 of setting management server 30 registers the game history information in game history DB 324 in association with the device ID of the game device (step Sg6).

The foregoing is a description of a case in which in the above operation shown in FIG. 35, game device 20 has subsequently connected to network 50.

1-2-3. Operation for Providing Game Play History Information

Figure 37:
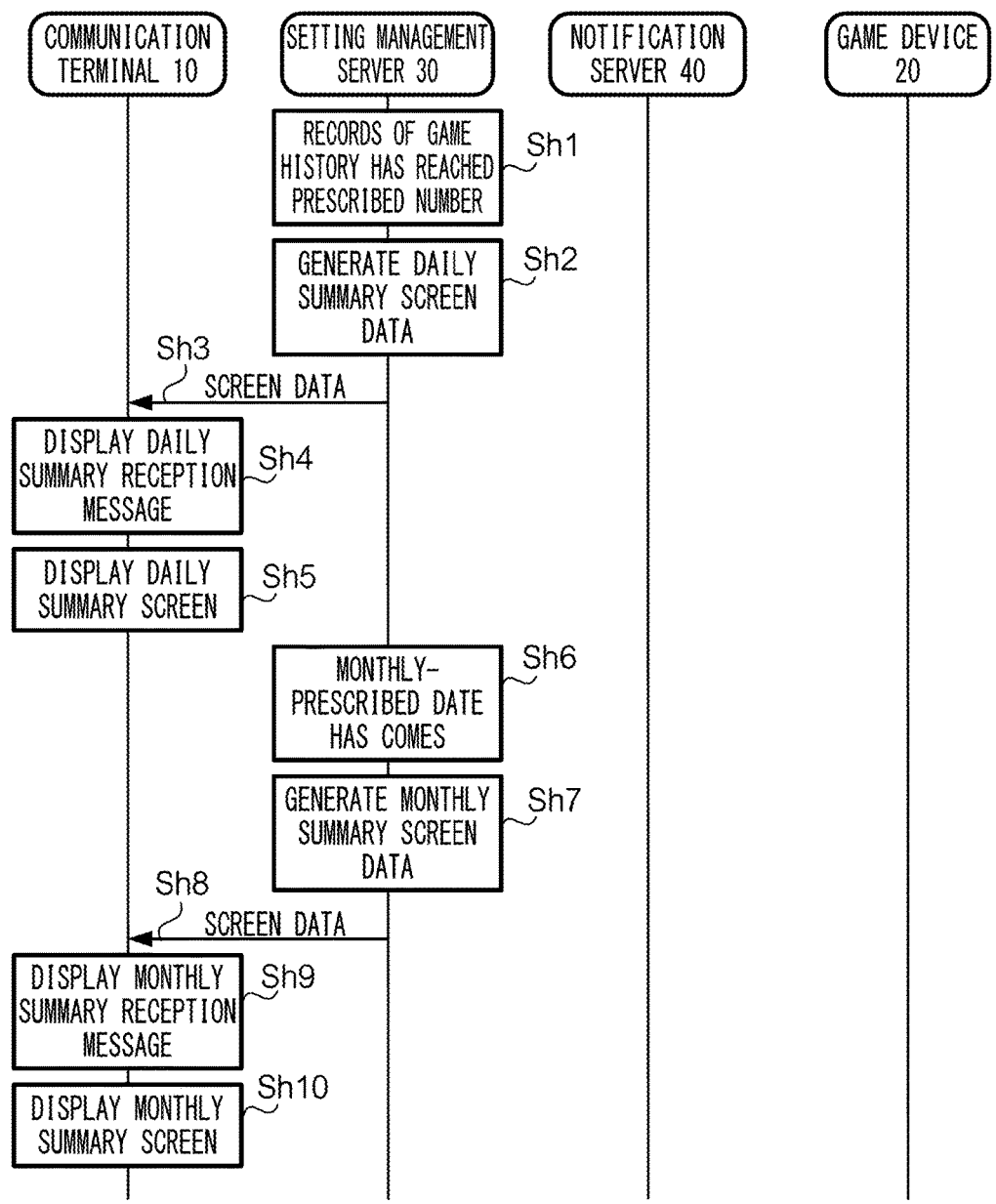
FIG. 37 is a sequence diagram showing an example of an operation for providing game play history information.

FIG. 37 is a sequence diagram showing an example of an operation for providing game play history information.

Play history information sending unit 316 of setting management server 30 monitors a game history of game device 20 registered in linkage information DB 322, and upon detecting accumulation of a predetermined number of records (step Sh1), generates daily summary screen data by referring to setting information DB 323, game history DB 324, and game information DB 325 (step Sh2) After generating the screen data, if game device 20 is associated with a monitoring notice flag "YES" in setting information DB 323, play history information sending unit 316 sends, as a push notification, the generated screen data to communication terminal 10 linked to the game device (step Sh3).

Figure 38:
FIG. 38 is a diagram showing an example of a daily summary receipt message.
Figure 39:
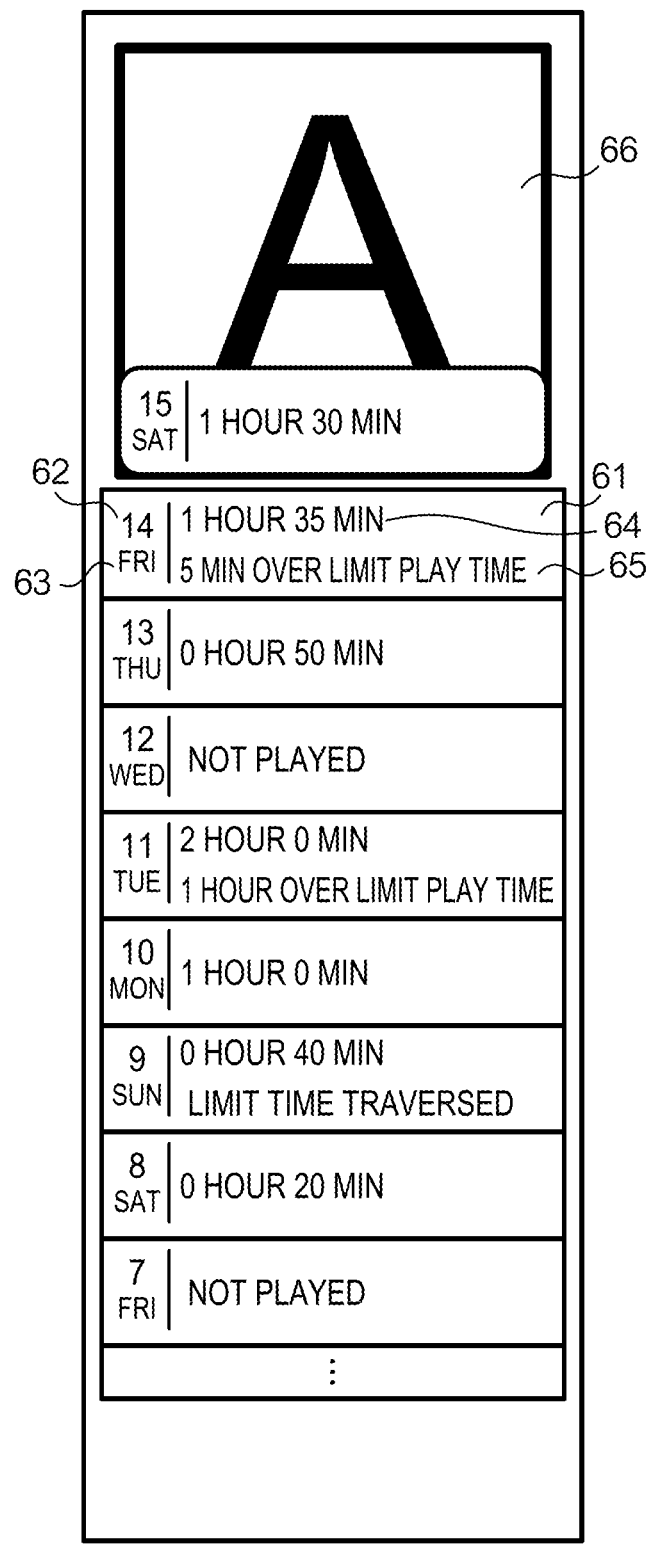
FIG. 39 is a diagram showing an example of a daily summary screen.

On receiving the daily summary screen data, communication terminal 10, if the monitoring program is not running, causes the program to run so that display control unit 111 causes display unit 13 to display a daily summary receipt message (step Sh4). FIG. 38 is a diagram showing an example of the daily summary receipt message. When a user selects a message "PRESS TO DISPLAY MORE" shown in the drawing, display control unit 111 causes display unit 13 to display a daily summary screen (step Sh5). FIG. 39 is a diagram showing an example of the daily summary screen.

The daily summary screen shows a list of total daily game play times. Display area 61 for each date includes date 62, day 63, total daily game play time 64, and message 65 notifying violation of a usage restriction. It is of note that in a modification, content of message 65 may be expressed in another form, such as a graphic. When the user selects display field 61 for a particular date, game image 66 of a game that has been played the longest at the particular date appears on the screen in association with the display field. It is of note that in a modification, in addition to or instead of game image 66, another type of game identification information such as a game name may be shown. The daily summary screen may be scrolled in a vertical direction to be browsed.

Also, play history information sending unit 316 of setting management server 30, on a predetermined date every month (step Sh6), generates monthly summary screen data based on a game history of game device 20 registered in linkage information DB 322 (step Sh7). After generating the screen data, if game device 20 is associated with a monitoring notice flag "YES" in setting information DB 323, play history information sending unit 316 sends, as a push notification, the generated screen data to communication terminal 10 linked to the game device (step Sh8).

Figure 40:
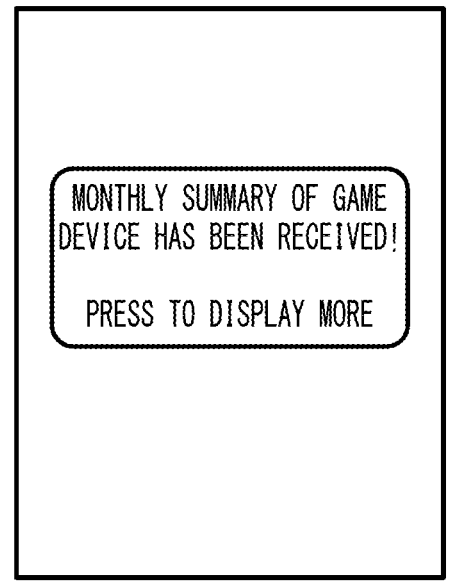
FIG. 40 is a diagram showing an example of a monthly summary receipt message.
Figure 41:
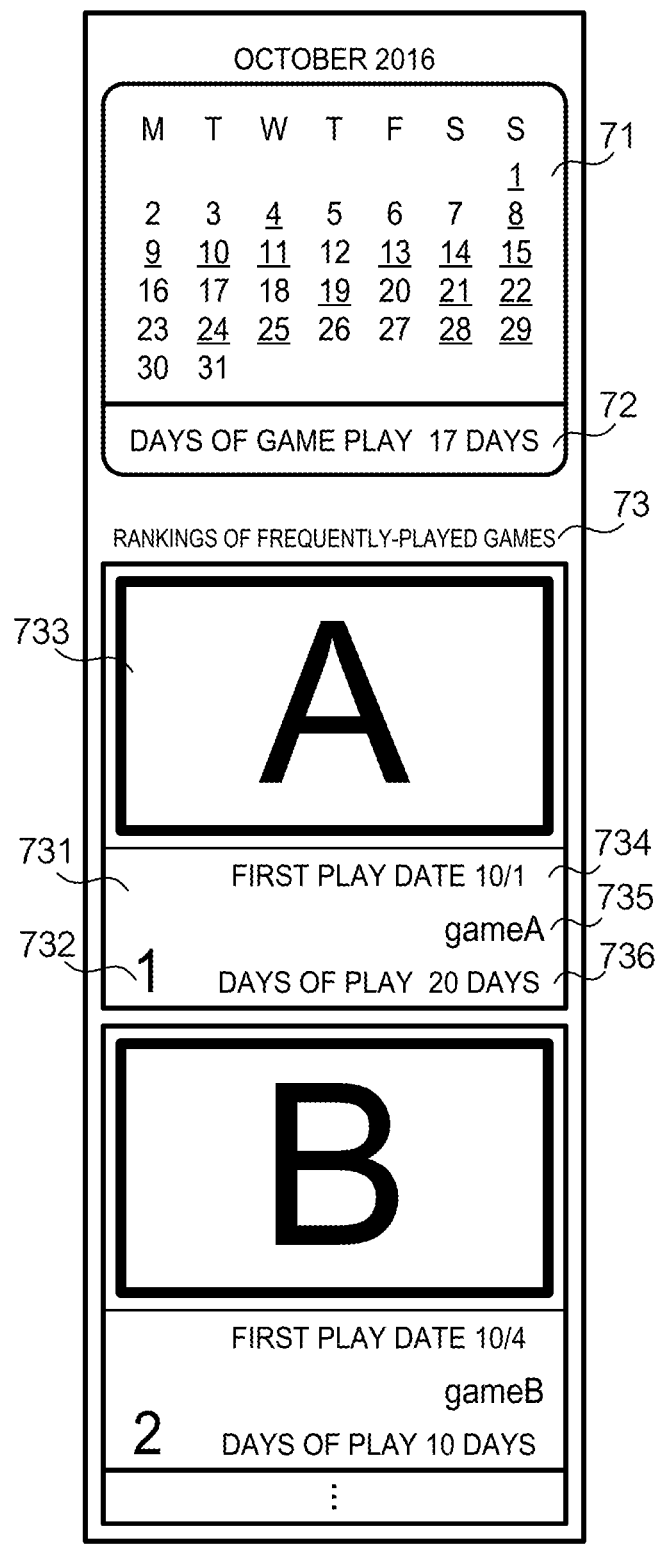
FIG. 41 is a diagram showing an example of a monthly summary screen.

On receiving the monthly summary screen data, communication terminal 10, if the monitoring program is not running, causes the program to run so that display control unit 111 causes display unit 13 to display a monthly summary receipt message (step Sh9). FIG. 40 is a diagram showing an example of the monthly summary receipt message. When a user selects a message "PRESS TO DISPLAY MORE" shown in the drawing, display control unit 111 causes display unit 13 to display a monthly summary screen (step Sh10). FIG. 41 is a diagram showing an example of the monthly summary screen.

The monthly summary screen shows monthly calendar 71, total number 72 of dates in a month on which a game has been played, and rankings 73 of games that have been played in a month. Monthly calendar 71 is shown in a manner such that dates on which a game has been played can be identified; specifically, the dates are shown in a color different from the dates on which no game has been played, although in FIG. 41, the dates are made identifiable by an underline for the purpose of illustration. It is of note that in a modification, the dates may be identified based on a size, font, or animation of date. Display area 731 for each of ranks constituting rankings 73 includes rank 732, game image 733, first play date 734, game name 735, and total number 736 of dates in a month on which a game has been played. The monthly summary screen may be scrolled in a vertical direction to be browsed.

The foregoing is a description of the operation for providing game play history information.

Communication system 1 described in the foregoing enables setting of usage restrictions in game device 20 via a network, which device is a not-always-connected terminal. Also, communication system 1 can cause, via network 50, game device 20 to upload a game history.

2. Modifications

The above embodiment may be modified as described below. It is of note that two or more modifications described below may be combined with each other.

2-1. Modification 1

Communication terminal 10 may be a terminal not always connected to network 50. Game device 20, if used for enabling display unit 13 to display the daily summary screen shown in FIG. 39 or the monthly summary screen shown in FIG. 41, may be a terminal always connected to network 50, such as a smartphone, a mobile phone, or a tablet device.

2-2. Modification 2

In game device 20, daily play time restrictions that differ depending on a day of the week may be set. A setting may be selectable such that, when a set daily play time has elapsed, execution of a game program is suspended forcibly. As another type of a time restriction, a play time limit may be set; for example, a time of day until which a user can play games using game device 20 may be set at 10 pm.

The functional restriction to be set in game device 20 may not always be classified to four restriction levels of child, elementary school kid, high or junior high school kid, and no setting; for example, types of executable game programs and restrictions on functions may be set individually.

2-3. Modification 3

Game device 20, when connecting to network 50 at predetermined intervals during a sleep mode, may perform the operation shown in FIG. 31, instead of the operation shown in FIG. 33. Specifically, game device 20, on receiving an instruction notice from notification server 40, may send a setting information request to setting management server 30. The present modification would reduce the processing burden of setting management server 30.

2-4. Modification 4

In the initial setting operation for a monitoring service shown in FIG. 13, setting management server 30, in a case where, as a result of the matching at step Sa12, the two registration codes agree with each other, may issue authentication information to be used in game device 20, to notify the authentication information to communication terminal 10. The authentication information may be stored in game device 20 as setting information, together with information on usage restrictions selected on the play time setting screen and the restriction level setting screen (steps Sa23 and Sa24). The authentication information herein refers to, for example, a personal identification number. The authentication information may be used in game device 20, for example, to set a restriction level, to cancel linkage with communication terminal 10, or to extend a playable time when a play time has reached a daily limit.

2-5. Modification 5

Setting management server 30, upon detecting that game device 20 has not been connected to network 50, so that the game device has not uploaded game history information for more than a predetermined time period (for example, 7 or 14 days), may send, as a push notification, a message to communication terminal 10 linked to the game device, which message urges a user of the communication terminal to connect the game device to the network. Also, setting management server 30, upon detecting that in game device 20 an incorrect personal identification number has been input, or a linkage with communication terminal 10 has been cancelled, may send, as a push notification, a message notifying the detected event to communication terminal 10 linked to the game device.

2-6. Modification 6

Functions of game device 20 may be provided by information-processing devices connected by a communication line (in other words, an information-processing system). Similarly, functions of setting management server 30 may be provided by information-processing devices connected by a communication line (in other words, an information-processing system).

2-7. Modification 7

The programs executed in communication terminal 10, game device 20, or setting management server 30 may be distributed using a computer-readable non-transitory storage medium, which includes a magnetic storage medium such as a magnetic tape or a magnetic disk, an optical storage medium such as an optical disk, a magneto-optical storage medium, or a semi-conductor memory. Alternatively, the programs may be distributed via a network such as the Internet.

What is claimed is:

1. A communication system comprising:
    a first communication terminal that includes at least one hardware processor;
    a second communication terminal that includes at least one hardware processor; and
    a server device that includes at least one hardware processor, wherein the first communication terminal, the second communication terminal, and the server device are each connectable to a network,
    wherein the at least one hardware processor of the first communication terminal is configured to cause a request to be sent to the server device for execution of processing that that includes applying usage restrictions on the second communication terminal, wherein the at least one hardware processor of the server device is configured to: receive the request and instruct the second communication terminal to perform the requested execution of processing that that includes applying the usage restrictions on the second communication terminal, wherein the at least one hardware processor of the second communication terminal is configured to:
control connection to the network, wherein the second communication terminal is not always connected to the network, and
based on control of the second communication terminal being connected to the network and reception of the instruction to perform the requested execution of processing, perform the instructed execution of processing that includes applying the usage restrictions on the second communication terminal that have been transmitted from the server.

2. The communication system according to claim 1, wherein the at least one hardware processor of the server device is configured to, upon detecting that the second communication terminal to which the instruction is to be provided is not connected to the network, notify the first communication terminal that the requested execution of processing has not been completed.

3. The communication system according to claim 1, wherein the at least one hardware processor of the server device is configured to, upon detecting that the instructed execution of processing for controlling usage restrictions on the second communication terminal has been performed, notify the first communication terminal that the requested execution of processing has been completed.

4. The communication system according to claim 1, wherein the instructed execution of processing includes setting of authentication information to be used in the second communication terminal.

5. The communication system according to claim 1 wherein:
at least one hardware processor of the server device is configured to, upon detecting that the second communication terminal to which the instruction is to be provided is not connected to the network, store, on a non-transitory storage medium of the server, setting information indicative of the restriction of use of the second communication terminal; and
at least one hardware processor of the second communication terminal is configured to, upon detecting that the second communication terminal has been caused to connect to the network, acquire the setting information that is stored in the non-transitory storage medium of the server.

6. The communication system according to claim 5, wherein the second communication terminal comprises a second non-transitory storage medium configured to store the acquired setting information.

7. The communication system according to claim 1, wherein the instructed execution of processing includes sending, to the server device, of information on a history of games that has been executed on the second communication terminal.

8. The communication system according to claim 1, wherein the second communication terminal is configured to connect to the network in response to at least one of an elapse of a predetermined time subsequent to a transition of the second communication terminal to a power saving mode, a power activation of the second communication terminal, a transition of the second communication terminal from a power saving mode to a normal mode, and an instruction from a user.

9. The communication system according to claim 1, wherein the second communication terminal is configured to, after the second communication terminal has been connected to the network and then performed the instructed execution of processing, terminate the connection to the network.

10. A communication method carried out in a communication system comprising a first communication terminal, a second communication terminal, and a server device, each of which is connectable to a network, the method comprising:
transmitting, from the first communication terminal and to the server, a request for the server device cause execution of processing on the second communication terminal that includes applying usage restrictions to the second communication terminal;
processing, at the server device, the request to cause execution of processing on the second communication terminal;
transmitting, from the server device and to the second communication terminal, an instruction to perform the requested execution of processing that includes applying usage restrictions to the second communication terminal;
controlling connection between the second communication terminal and the network, wherein the second communication terminal is not always connected to the network;
based on detecting that the second communication terminal, which was not connected to the network, has been caused to connect to the network, receiving the instructions transmitted from the server device and performing the requested execution of processing that includes applying usage restrictions to the second communication terminal.

11. A communication terminal that is connectable to a server device via a network, the communication terminal comprising:
a transceiver configured to communicate with the server device and control connection to the network; and
a processing system that includes at least one hardware processor that is coupled to the transceiver, the processing system configured to:
control the connection between the second communication terminal and the network, wherein the second communication terminal is not always connected to the network;
based on detection that the second communication terminal, which was not connected to the network, has been caused to connect to the network, receive instructions transmitted from the server, the instructions including usage restriction instructions to apply to the second communication terminal; and
responsive to reception the instructions, perform the instructions and at least apply the usage restrictions to the second communication terminal.

12. An information-processing system that is connectable to a server device via a network, the server device instructing the information-processing system to perform execution of processing, the information-processing system comprising:
a transceiver configured to communicate with the server device and control connection to the network; and a processing system that includes at least one hardware processor that is coupled to the transceiver, the processing system configured to:
control the connection between the second communication terminal and the network, wherein the second communication terminal is not always connected to the network;
based on detection that the second communication terminal, which was not connected to the network, has been caused to connect to the network, receive instructions transmitted from the server, the instructions including usage restriction instructions to apply to the second communication terminal; and
responsive to reception the instructions, perform the instructions and at least apply the usage restrictions to the second communication terminal.

13. An information-processing method carried out by a communication terminal that is connectable to a server device via a network, the server device configured to provide instructions to instructing the communication terminal to perform execution of processing, the method comprising:
communicating with the server device while the communication terminal is connected to the network;
controlling the connection between the second communication terminal and the network, wherein the second communication terminal is not always connected to the network;
based on detection that the second communication terminal, which was not connected to the network, has been caused to connect to the network, receiving instructions transmitted from the server, the instructions including usage restriction instructions to apply to the second communication terminal; and
responsive to reception the instructions, performing the instructions and at least apply the usage restrictions to the second communication terminal.

14. A non-transitory storage medium storing a program for causing a computer to execute a process, the computer being connectable to a server device via a network, the server device instructing the computer to perform execution of processing, the program comprising instructions that cause the computer to:
communicate with the server device while the communication terminal is connected to the network;
control the connection between the second communication terminal and the network, wherein the second communication terminal is not always connected to the network;
based on detection that the second communication terminal, which was not connected to the network, has been caused to connect to the network, process received instructions that have been transmitted from the server, the instructions including usage restriction instructions to apply to the second communication terminal; and
responsive to reception the instructions, perform the instructions and at least apply the usage restrictions to the second communication terminal.

15. The communication system of claim 1, wherein the usage restrictions include a time usage restriction that defines a length of time.

16. The communication system of claim 15, wherein the length of time defines a limit on an amount of time a user can play games on the second communication terminal during a day.

17. The communication system of claim 1, wherein the usage restrictions include a functional restriction for a type or function of application program that is executable on the second communication terminal.

* * * * *